US00RE35343E

United States Patent [19]

Shimada et al.

[11] E Patent Number: Re. 35,343

[45] Reissued Date of Patent: Oct. 1, 1996

[54] REMOTE-CONTROLLING COMMANDER WITH MULTI-FUNCTION ROTARY DIAL

[75] Inventors: Keiichiro Shimada; Tatsuya Wakahara; Noboru Shibuya, all of Kanagawa-ken, Japan

[73] Assignee: Sony Corporation, Tokyo, Japan

[21] Appl. No.: 377,663

[22] Filed: Jan. 23, 1995

Related U.S. Patent Documents

Reissue of:

[64] Patent No.: 4,866,542
Issued: Sep. 12, 1989
Appl. No.: 942,978
Filed: Dec. 17, 1986

U.S. Applications:

[63] Continuation of Ser. No. 754,640, Sep. 4, 1991, abandoned.

[30] Foreign Application Priority Data

Dec. 27, 1985 [JP] Japan ..... 60-295292

[51] Int. Cl.[6] ..... H04N 5/783

[52] U.S. Cl. ..... 386/10.3; 360/71; 360/73.08; 386/80; 386/81

[58] Field of Search ..... 369/6, 7; 358/335, 358/191.1, 194.1; 360/33.1, 10.1, 14.1, 61, 10.3, 71, 73.01, 73.04, 73.05, 73.08; 455/181, 186, 185, 179, 603, 181.1, 179.1, 185.1, 186.1, 186.2; 361/340; 200/33 R; 340/688, 870.08; 359/142

[56] References Cited

U.S. PATENT DOCUMENTS

| | | | |
|---|---|---|---|
| 3,987,414 | 10/1976 | Tuma | 358/194.1 |
| 4,045,777 | 8/1977 | Mierzwinski et al. | 340/168 |
| 4,081,754 | 3/1978 | Jackson | 325/396 |
| 4,206,483 | 6/1980 | Nakamura | 360/33 |
| 4,270,117 | 5/1981 | Ziegelbein et al. | 340/168 |
| 4,325,081 | 4/1982 | Abe et al. | 358/127 |
| 4,352,010 | 9/1982 | Koogler | 235/92 |
| 4,356,509 | 10/1982 | Skerlos et al. . | |
| 4,381,522 | 4/1983 | Lambert . | |
| 4,404,531 | 9/1983 | Genrich | 331/64 |
| 4,428,005 | 1/1984 | Kubo | 360/10.3 |
| 4,456,925 | 6/1984 | Skerlos et al. . | |
| 4,521,806 | 6/1985 | Abraham . | |
| 4,527,204 | 7/1985 | Kozakai et al. | 360/33.1 |
| 4,538,188 | 8/1985 | Barker et al. | 360/14.3 |
| 4,539,603 | 9/1985 | Takeuchi et al. | 360/10.1 |
| 4,539,711 | 9/1985 | Harga | 455/166 |
| 4,712,105 | 12/1987 | Kohler | 358/194.1 |
| 4,718,112 | 1/1988 | Shinoda | 358/194.1 |
| 4,786,982 | 11/1988 | Wakahara et al. | 358/335 |

FOREIGN PATENT DOCUMENTS

| | | |
|---|---|---|
| 0002434 | 9/1978 | European Pat. Off. . |
| 0188162 | 7/1986 | European Pat. Off. . |
| 2491707 | 9/1982 | France . |
| 2822672 | 11/1979 | Germany . |
| 2006559 | 5/1979 | United Kingdom . |
| WO8103713 | 12/1981 | WIPO . |

*Primary Examiner*—W. R. Young
*Attorney, Agent, or Firm*—Limbach & Limbach L.L.P.; Philip M. Shaw, Jr.

[57] ABSTRACT

A remote-controlling commander includes a rotary dial rotatably mounted on a commander housing for manual operation of the user. The commander also includes a position detector for monitoring angular position of the rotary dial, in which the angular position and/or angular displacement of the rotary dial represents which operation of the apparatus is to be controlled and an encoder for producing an encoded signal variable depending upon the angular position and/or angular displacement of the rotary dial. The encoded signal is transmitted through a transmitter to a receiver provided in the apparatus to be controlled. The received signal is decoded in the apparatus to trigger the function represented by the received signal. The received signal from the remote-controlling commander may be used to perform functions associated with a VTR, such as timing of video recording, picture searching, channel timing, and the like.

22 Claims, 13 Drawing Sheets

REMOTE-CONTROLLING COMMANDER WITH MULTI-FUNCTION ROTARY DIAL

Matter enclosed in heavy brackets [ ] appears in the original patent but forms no part of this reissue specification; matter printed in italics indicates the additions made by reissue.

*CROSS REFERENCE TO RELATED APPLICATION*

*This application is a continuation of application Ser. No. 07/754,640, filed Sep. 4, 1991, now abandoned, which is a reissue of application Ser. No. 06/942,978, filed Dec. 17, 1986, and issued as U.S. Pat. No. 4,866,542, on Sep. 12, 1989.*

BACKGROUND OF THE INVENTION

1. Field of the Invention

The present invention relates generally to a remote controlling commander which can transmit various commands to an apparatus to be controlled, such as a video tape recording and reproducing apparatus (VTR) and so forth. More specifically, the invention relates to a remote-controlling commander which can perform various control functions for the apparatus with a simplified control key arrangement.

2. Description of the Background Art

In recent years, various electrical or electronic apparatus, such as a VTR and so forth, need to facilitate [and] *an* increasing number of functions to be performed. For example, a modern VTR may facilitate not only video recording and reproducing functions, but also timer recording functions, a variable speed video reproducing function and so forth. In order to perform such a great number of operations, the apparatus requires relatively complicated key operations for the user.

On the other hand, in [the] recent years, remote-controlling commanders for remote controlling the apparatus, such as VTR, have become a popular convenience for the users. The remote-controlling commander has been required to facilitate the capability of controlling most of the functions that can be performed by the apparatus. Therefore, the arrangement of an operation-key on the remote-controlling commander becomes more and more complicated and is difficult for the users to accurately operate to obtain the desired function.

In order to simplify the key arrangement, there has been proposed in the European Patent First Publication 01 88 162 a VTR with a multi-function rotary dial device. The multi-function rotary dial device performs a timer setting operation, a channel selecting operation, a reproduction speed control operation, and so forth. This significantly simplifies the key arrangement of the operation key array on the VTR. Furthermore, such a multi-function rotary dial allows reproduction of a video image at various speeds such as in a still mode, at ½ speed, at double speed, and so forth.

The purpose of the invention is to simplify the operation key array on the remote-controlling commander by employing the multi-function rotary dial device and to increase the number of remotely controllable functions that can be performed by the commander.

SUMMARY OF THE INVENTION

Therefore, it is an object of the present invention to provide a remote-controlling commander which has a simplified key array and can be easily operated to perform remote-control operations.

Another object of the invention is to provide a remote controlling commander that is capable of remotely controlling an apparatus to be controlled, such as a VTR, by means of a multi-function rotary dial.

In order to accomplish the aforementioned, and other objects, a remote-controlling commander, according to the present invention, includes a rotary dial rotatably mounted on a commander housing for manual operation of by the user. The commander also includes a position detector for monitoring *the* angular position of the rotary dial, in which the angular position and/or angular displacement of the rotary dial represents which operation of the apparatus is to be controlled and an encoder for producing an encoded signal which is variable depending upon the angular position and/or angular displacement of the rotary dial. The encoded signal is transmitted through a transmitter to a receiver provided in the apparatus to be controlled. The received signal is decoded in the apparatus to trigger the function represented by the received signal.

In practice, the commander further includes a signal processing circuit associated with a detector monitoring the angular position of the rotary dial. The signal processing circuit processes the detector signal from the detector to produce a direction indicative signal indicative of the direction toward which angular displacement of the rotary dial occurs, and a velocity indicative signal indicative of the velocity of angular displacement of the rotary dial.

According to one aspect of the invention, a system for remote-controlling an apparatus which performs different functions including a first function and second function, comprises a controller provided in the apparatus for controlling operation of the apparatus and selecting operation modes for accomplishing different functions [to] according to a control command; first means, incorporated in the apparatus and associated with the controller for performing the first function; second means, incorporated in the [apapratus] *apparatus* and associated with the controller for performing the second function; a remote control command including a push button for selecting operation modes of the apparatus and producing a remote control signal carrying the control command, the remote control commander including a rotary dial assembly operable for generating the control command for operating the first and second means selectively for performing the first and second functions.

The remote control commander includes a mode selector switch for selecting an operation mode of the remote control commander at least among a first position, at which the control command generated by the remote control commander operates the first means for performing the first function, and a second position, at which the control command generated by the remote control commander operates said second means for performing the second function. The remote control commander includes third means for monitoring angular displacement of a rotary dial in the rotary dial assembly [anmd] *and* producing a command signal representative of *the* angular position of the rotary dial, and fourth means responsive to the command signal from the third means, for encoding a remote control signal to be transmitted therefrom for transmitting the remote control signal carrying the control command.

The rotary dial assembly comprises a dial manually rotatable at a desired speed in opposing first and second directions, a first sensing means for monitoring *the* magnitude of angular displacement of the dial and producing a rotation angle indicative signal, a timer set mode switch manually operable to produce a timer set mode selector signal ordering the video tape recorder system to operate in a timer set mode, a display for displaying at least symbols representing a timer-activated recording start timing and end timing, and a controller responsive to the timer set mode selector signal for changing the value represented by each of the symbols at a given rate on the display, the given rate being selected on the basis of the values of the direction indicative signal and the rotating angle indicative signal.

The system further comprises a second sensing means for monitoring the rotation speed of the dial and producing a rotation speed indicative signal, and the controller is responsive to the rotation speed indicative signal to adjust the given rate based thereon.

The video tape recorder further operates in a picture search mode as the second function, and the remote control commander further comprises means for triggering a picture search mode and producing a command for entry into the picture search mode, and the controller is responsive to the command to perform forward and reverse playback selectively and at a given speed according to rotation of the rotary dial.

In the alternative, the remote control commander includes a pause switch for operating the video tape recorder at a pause mode for temporarily stopping playback so as to freeze an image on a television monitor, the pause switch serving as the picture search triggering means.

In the preferred embodiment, the rotary dial assembly further comprises a ring rotatable independently of the dial and a fourth sensing means monitoring the angular position of the ring and producing a shuttle mode selector signal when angular displacement of the ring is detected, and the controller is responsive to the shuttle mode selector signal in the presence of a command for selectively performing forward and reverse playback at a variable playback speed varying in accordance with the direction and magnitude of angular displacement of the ring. The first and second sensing means also cooperate with the ring for monitoring angular displacement of the latter and producing the rotating direction indicative signal and the rotation angle indicative signal. The controller is also responsive to rotation of the dial in the presence of the command for performing forward and reverse playback selectively at a given speed according to rotation of the dial.

On the other hand, the video tape recorder system also has a television tuner for selecting a television channel and in which the selected television channel is indicated on the display, further comprising means for triggering a channel set mode for the video tape recorder system for selecting a television channel, and the controller is responsive to rotation of the dial in the channel set mode to adjust the channel selection according to angular displacement of the dial. The system further comprises a second sensing means for monitoring the rotation speed of the dial and producing a rotation speed indicative signal, and the controller is responsive to the rotation speed indicative signal to adjust the given rate in accordance therewith.

In the alternative embodiment, the controller adjusts the rate of change of the television channel in the channel set mode depending upon the rotation speed indicative signal value.

The dial and the ring are associated with a common rotary plate with which the first and second sensing means are associated for monitoring the direction, magnitude and speed of angular displacement thereof. The dial is further associated with a click mechanism providing a detent action at every given angle of angular displacement, which given angle corresponds to one frame of a video signal.

According to another aspect of the invention, a remote-controlling commander for a video tape recorder system capable of recording and reproducing video signals, performing picture search, and including a television tuner for varying a television channel, comprises a rotary dial assembly which includes a rotary dial manually rotatable at a desired speed in opposing first and second directions, a first sensing means for monitoring magnitude of angular displacement of the dial and producing a rotation angle indicative signal, a channel set mode switch manually operable to produce a first mode selector signal ordering the video tape recorder system to operate in a television channel set mode; and an encoder responsive to the first mode selector signal and the rotation angle indicative signal for generating a remote control signal to be transmitted to the video tape recorder for changing a television channel set according to the angular position of the rotary dial.

The video tape recorder system includes a controller responsive to the remote control signal encoded by the first mode selector signal and the rotation angle indicative signal for changing the value represented by each television channel at a given rate on a display of the video tape recorder system, the given rate being selected on the basis of the values of the direction indicative signal and the rotating angle indicative signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
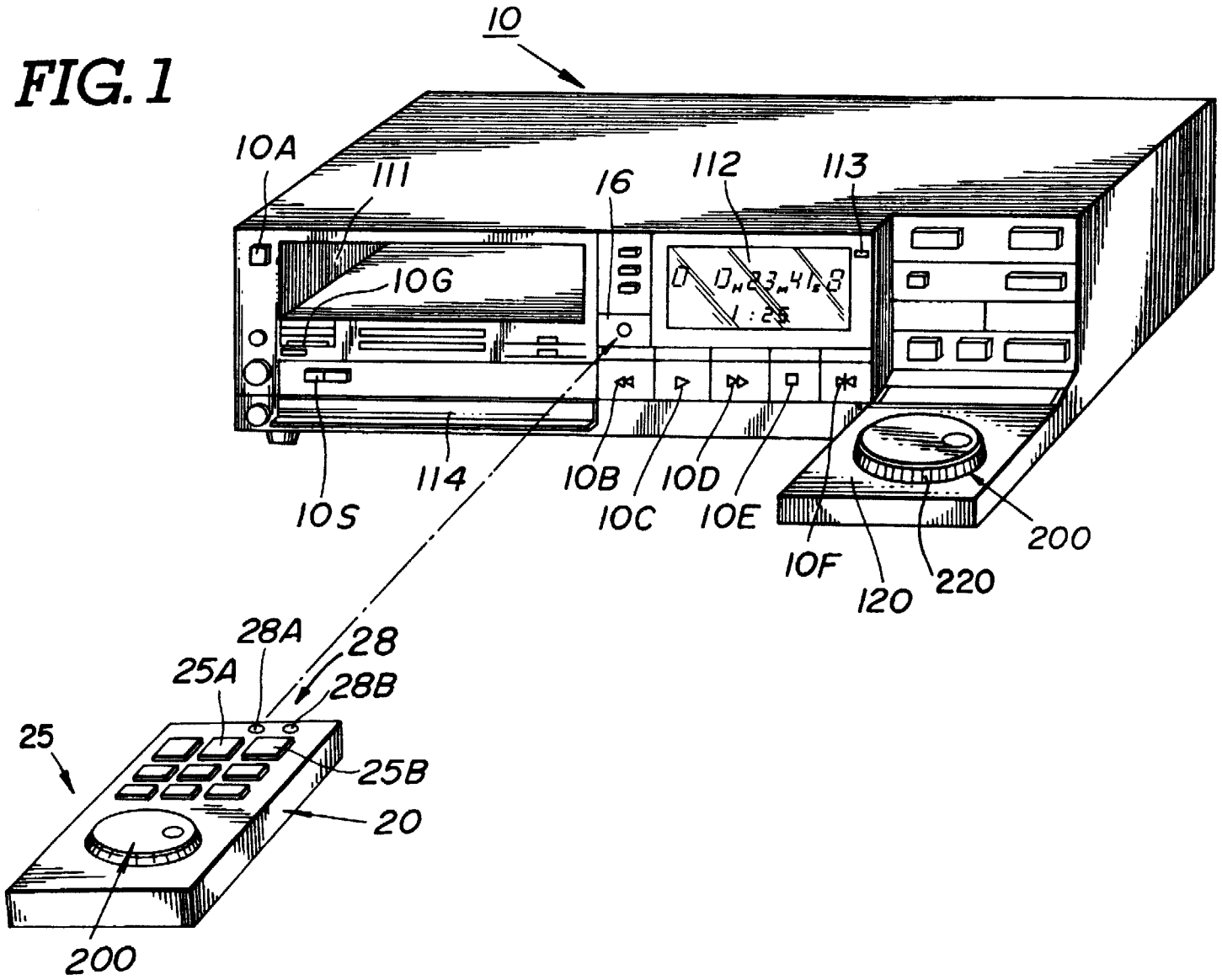
FIG. 1 is a perspective view of a VTR deck and the preferred embodiment of a remote-controlling commander with a rotary dial according to the present invention.

Referring now to the drawings, particularly to FIGS. 1 to 5, the preferred embodiment of a remote-controlling commander 20 is provided with a rotary dial 200 for remote controlling a VTR deck 10 which facilitates a rotary dial 200 of identical construction to that in the remote-controlling commander.

It should be appreciated that although the preferred embodiment of the remote-controlling commander 20 according to the present invention[,] will be described hereinbelow in terms of remote controlling of a VTR, the commander can control various electrical or electronic equipment, such as a television set, a character information system accessible through telephone line, such as so-called 'videotex' or 'CAPTAIN system', an audio set and so forth. Furthermore, though the shown embodiment of the remote-controlling commander cooperates with a VTR deck which has a rotary dial of identical construction to that facilitated in the commander, it would be applicable for any type of VTR deck having a compatible control command format.

The VTR 10 has a front panel 110 with an opening 111 through which a VTR tape cassette may be inserted, this opening will be hereafter referred to as 'cassette insert'. The cassette insert 111 establishes communication between the exterior of the deck and a cassette compartment within the deck and is normally covered by a lid 111a. Near the cassette insert 111, an eject button $\mathbf{10}_G$ is provided. The eject button $\mathbf{10}_G$ is associated with a cassette eject mechanism (not shown) in a per se well-known manner.

On the front panel 110, a power switch button $\mathbf{10}_A$, mode selector buttons, e.g. a rewinding button $\mathbf{10}_B$, a playback button $\mathbf{10}_C$, a fast-forward button $\mathbf{10}_D$, a stop button $\mathbf{10}_E$ and a pause button $\mathbf{10}_F$ are provided. Such mode selector buttons are associated with a VTR system housed in the deck 110 in a per se well-known manner. A display 112 on the front panel 110 lies side-by-side with the cassette insert 111. The display 112 serves as a clock for displaying the time, and as a real-time counter for displaying recording time and/or playback time. The display 112 may also serve as a mode indicator for indicating the current operation mode of the VTR system, or as a channel indicator for a TV tuner which is incorporated within the VTR system in a per se well-known manner. The display 112 may also serve as a time-activated recording indicator which may be set to turn on when timer-activated recording is ordered.

Although it is not clearly shown in the drawings, the front panel 110 also has a record button for selecting a recording mode. An input selector 105 (shown in FIG. 4) is also provided on the front panel 110 below the cassette insert 111. The input selector 105 is normally hidden by means of a lid 114. The input selector 105 switches the video signal source between a TV tuner and other input sources, such as other VTR systems, a PCM signal reproducing apparatus and so forth.

Figure 2:
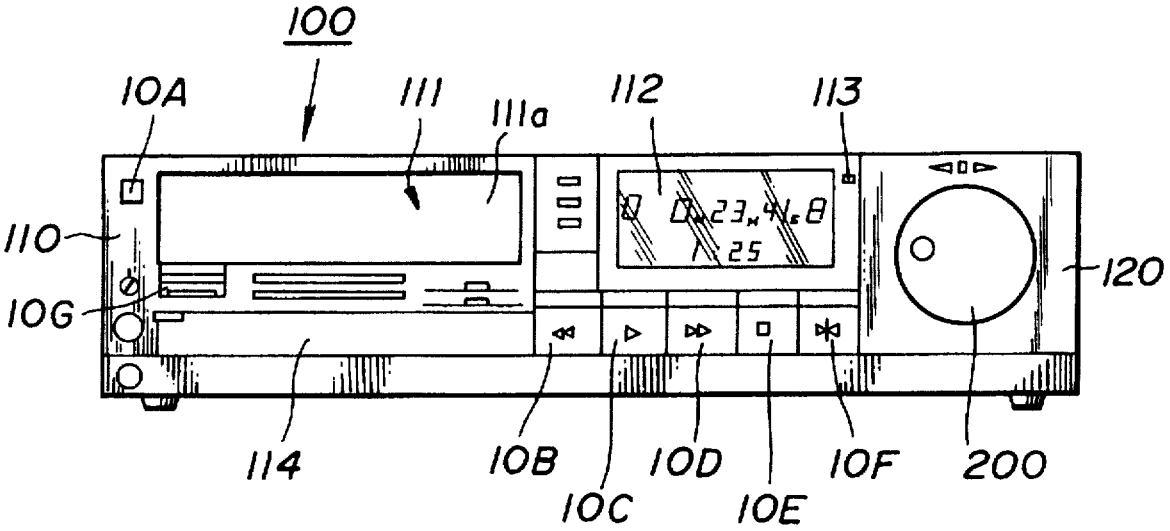
FIG. 2 is a front elevation of the VTR deck of FIG. 1.
Figure 3:
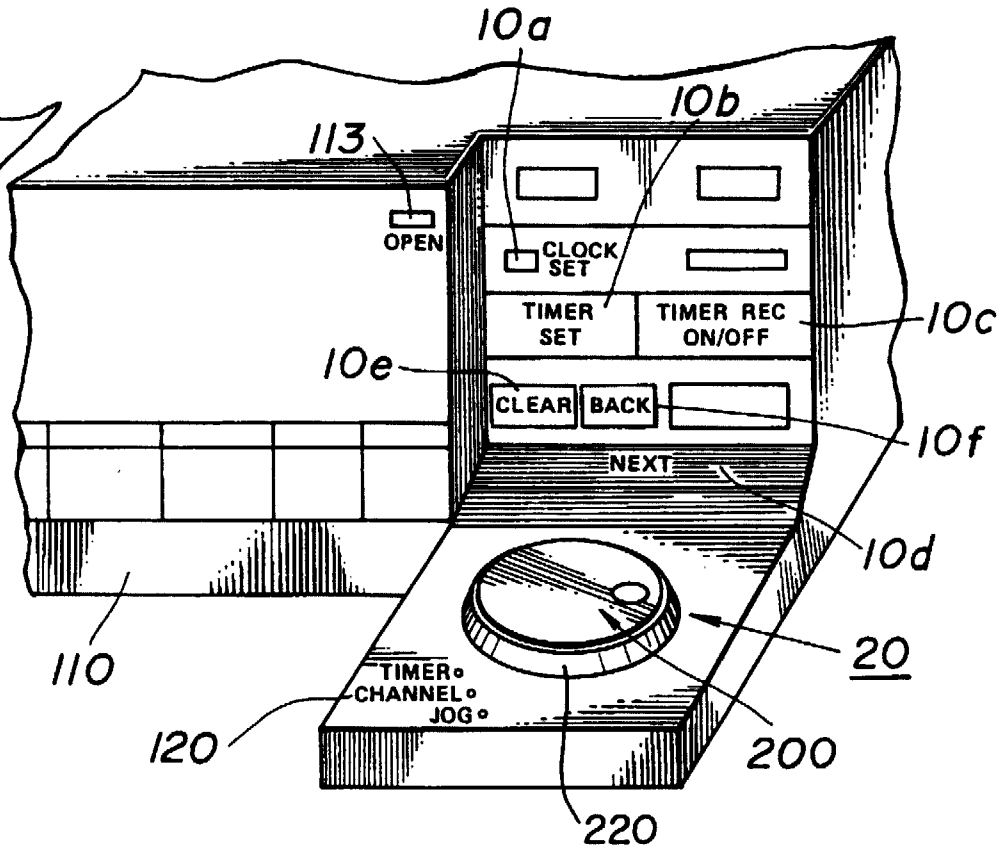
FIG. 3 is an enlarged partial perspective view of a major part of the VTR deck of FIG. 1.
Figure 4:
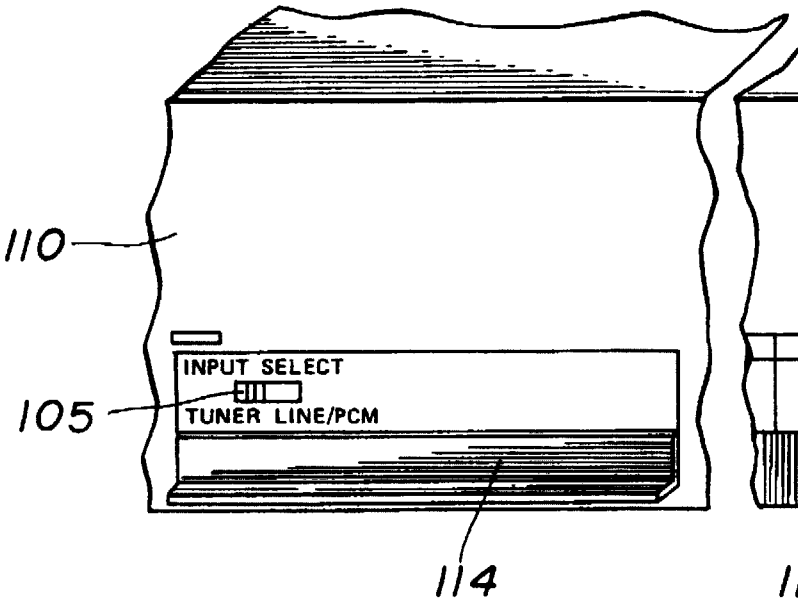
FIG. 4 is an enlarged partial perspective view of another major part of the VTR deck of FIG. 1.

A rotary dial assembly 200 is mounted on a sub-panel 120 installed on the front panel 110 to the side of the display 112 opposite the cassette insert 111. The rotary dial assembly [20] *200* is designed to allow timer setting, manual scanning and playback speed selection in the shown embodiment. Also, the rotary dial assembly may serve as a TV-channel selector while the TV tuner in the VTR system is active. The sub-panel 120 is pivotably connected to the front panel 110 at its lower edge and is movable between a vertical position at which the front surface of the sub-panel 120 lies flush with the front surface of the front panel as shown in FIG. 2, and a horizontal position at which the sub-panel 120 extends horizontally from the front panel 110 as shown in FIG. 1 and 3. The sub-panel 120 is normally in the vertical position and locked by means of an appropriate locking mechanism. In order to unlock the locking mechanism and allow the sub-panel to move to the horizontal position, a release button 113 is provided on the front panel 110, this release push button is located adjacent the sub-panel 120 and will be referred to hereafter as a 'subpanel open button'. Timer set operation buttons are disposed on the portion of the front panel 110 normally concealed by the sub-panel 120. The timer set operation buttons consist of a clock set button 10a, a timer set mode selector button 10b, a timer recording ON/OFF button 10c, a next item selector button 10d, a clear button 10e and a item-back button 10f. The functions of these timer set operation buttons will be described in detail below.

As will be apparent from FIGS. 1 to 5, a rotary dial assembly 200 is accessible in both the vertical and horizontal positions of the sub-panel 120. The rotary dial assembly [20] *200* also has a shuttle ring 220. At the vertical position, in a pause mode, rotation of the rotary dial allows the user to scan forward and backward through the tape at a speed proportional to the rotation speed of the rotary dial; this action will be hereafter referred to as a 'manual scan'. While in the horizontal position, the rotary dial 200 can be rotated to adjust the timer setting for timer-activated recording; and the shuttle ring can be rotated to select playback speed of the tape. In the preferred embodiment, the playback speed may be adjusted by means of the shuttle ring 220, and is variable in 5 graduating increments of one-fifth, one half, normal, et cetera. Detailed construction of the rotary dial assembly and operation thereof will be described later.

The VTR deck as set forth above is also coupled with the remote-controlling commander 20, the remote-controlling commander 20 is generally of a compact size suitable for hand carrying. The commander 20 generally transmits a control command toward a control command receiver 16 provided on the front panel 110. In practice, the control command is in the form of an infrared light beam encoded with control command data. As shown in FIG. 1, the commander 20 is provided with a push button array 25 including a plurality of push buttons 25A, 25B . . . for manually selecting the operation mode of the VTR. As set forth, the commander 20 is also provided with a rotary dial assembly 200 of identical construction to that facilitated in the VTR deck 10. Similar to that facilitated in the VTR deck 10, the rotary dial assembly 200 on the commander 20 allows manual scanning, variable speed tape playback channel selection, and timer setting as will be discussed later in greater detail. Utilizing the push button array 25 and the rotary dial assembly 200, the VTR may be operated in various operational modes.

The remote-controlling commander 20 also has indicators which are generally represented by the reference numeral 28. In practice the indicators 28 comprise a plurality of luminous elements 28A, 28B . . . , such as luminous diodes, for indicating commander operation.

As set forth above, the rotary dial assembly 200 of the remote-controlling commander 20 serves for timer setting, TV channel selection, and variable mode reproduction, similar to the functions that can be performed by the rotary dial assembly 200 in the VTR deck 10. In order to select the operation mode of the rotary dial assembly 200, the remote-controlling commander 20 has mode selector switches. In the shown embodiment, the push button 25A serves as the selector switch for the variable speed reproduction mode which will be referred to hereafter as a 'JOG/SHUTTLE mode'. On the other hand, the push button 28B serves as a TIMER/CHANNEL mode selector switch. In practical mode selection, the JOG/SHUTTLE selector switch 25A is operable between an ON position and an OFF position by manual depression. A the ON position, the remote-controlling commander operation mode is set at the JOG/SHUTTLE MODE for reproducing the VTR signal at a variable speed. On the other hand, the TIMER/CHANGE mode switch 25B is also operable between a TIMER position and a CHANNEL position. While the JOG/SHUTTLE mode switch 25A is in the OFF position, the remote-controlling commander 20 operates in a TIMER/CHANNEL mode. The TIMER/CHANNEL selector switch 25B is normally set at the CHANNEL mode position for allowing TV channel selection. The TIMER set mode is selected by manual operation of the TIMER/CHANNEL selector switch 25B. When the JOG/SHUTTLE mode selector switch 25A is depressed to be turned to the ON position the TIMER/CHANNEL mode operation is disabled and JOG/SHUTTLE mode operation is enabled allowing adjustment of the reproduction speed by operation of the rotary dial assembly 200.

Figure 6:
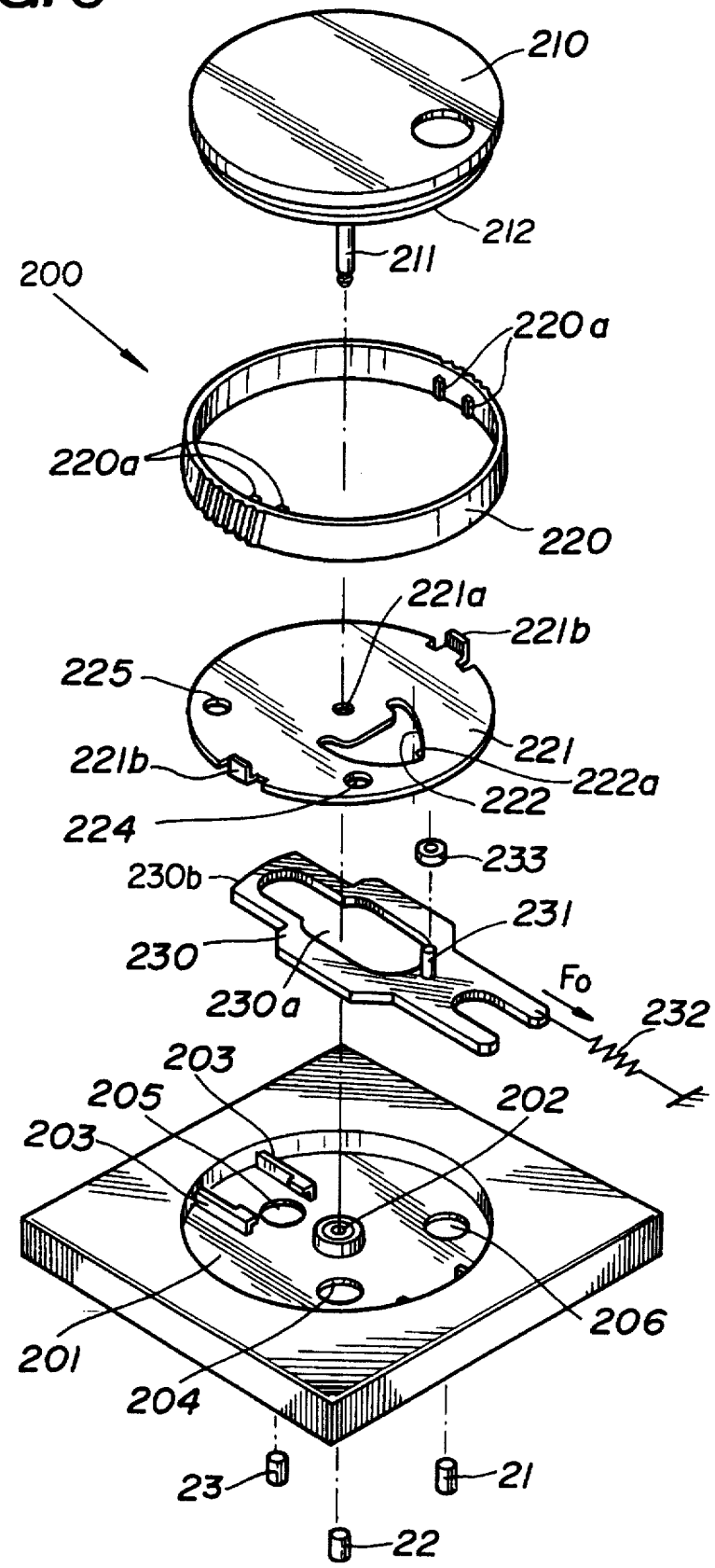
FIG. 6 is an enlarged and exploded perspective view of the preferred embodiment of a rotary dial assembly according to the present invention.
Figure 7:
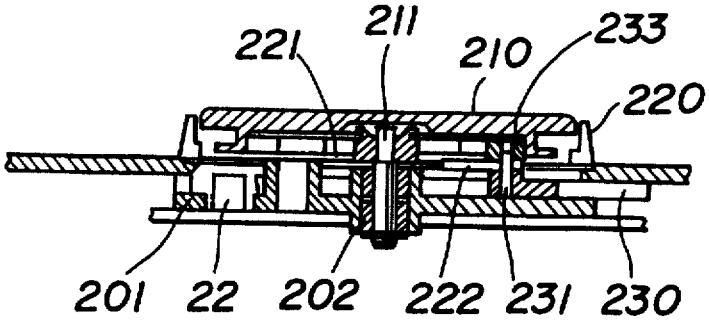
FIG. 7 is a cross-section through the assembled rotary dial assembly.

As shown in FIGS. 6 and 7, the rotary dial assembly 200 is rotatably mounted on a base 201 which is formed integrally on the sub-panel 120. The base 201 defines a rest 121 for receiving a dial disc 210 and other equipment forming part of the rotary dial 200 and the shuttle ring 220. The base 201 is circular in plan view and has a central bearing boss 202 which rotatably receives a rotary shaft 211 formed on the dial disc 210. The rotary shaft 211 is fixed to the dial disc 210 for rotation therewith and extends through a central opening 221a formed through a rotary disc 221. The rotary disc 221 is rotatable about the rotary shaft 211 and has a generally heart-shaped cam hole 222. The cam hole 222 cooperates with an actuation pin 231 extending from a slide lever 230. The slide lever 230 has an elongated hole 230a through which the rotary shaft 211 passes. The elongated hole 230a extends along the longitudinal axis of the slide lever 230 and has a transverse width greater than the diameter of the bearing boss 202 so as to allow sliding movement across in the base 201.

The base 201 has three holes 204, 205 and 206 for receiving optical sensors 21, 22 and 23 respectively. The optical sensors 21, 22 and 23 monitor angular displacement of the rotary dial 200 and the shuttle ring, the operation of which will be described later.

The slide lever 230 has a section 230b that slidably engages with a pair of guides 203 formed on the base 201. The guide 203 on the base 201 serves as a retainer for the slide lever 230 and guides movement of the slide lever along its longitudinal axis. The slide lever 230 is biased in a direction $F_o$ by means of a bias spring 232. The biasing force $F_o$ exerted by the slide lever 230 urges the pin 231 into the section 222a of the cam hole 222.

The rotary disc 221 has a pair of vertical tabs 221b extending vertically from its periphery. The shuttle ring 220 has spaced pairs of extensions 220a engaging the strips 221b for rotation with the rotary disc 221.

Figure 8:
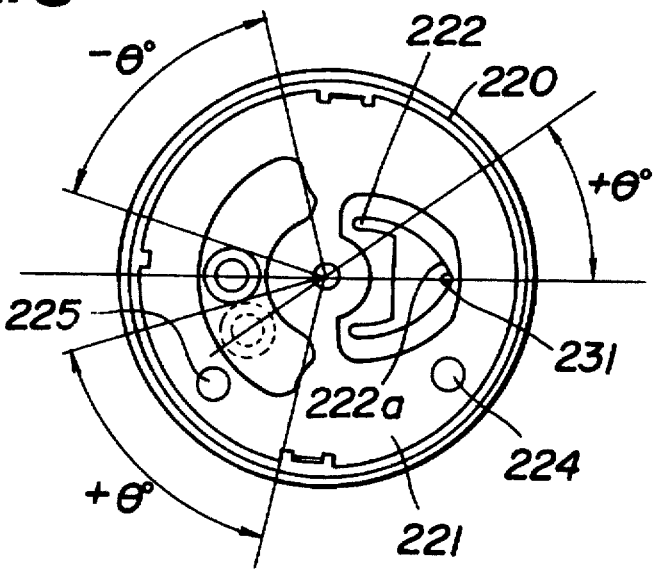
FIG. 8 is a diagram of the interaction between a shuttle ring in the rotary dial assembly and a rotary disc.
Figure 9:
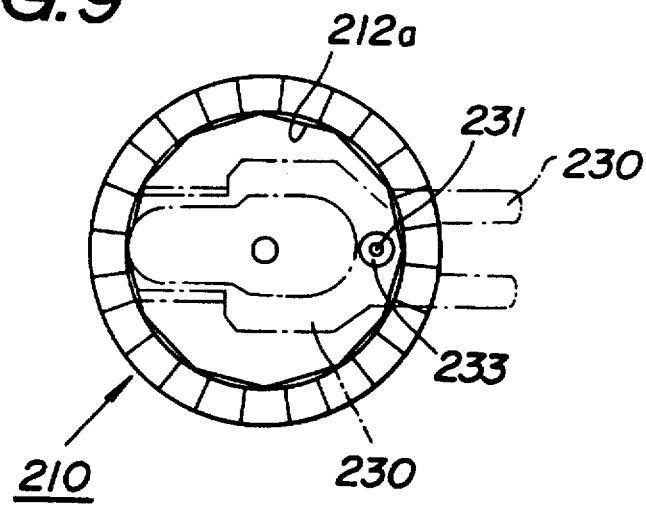
FIG. 9 is a diagram of a click mechanism of the rotary dial assembly of FIG. 6.

The slide lever 230 cooperates with the shuttle ring 220 in such a manner that when the shuttle ring 220 is rotated through the angle $+\theta_1$ as shown in FIG. 8, the pin 231 is positioned in the cam hole 222. At this position, component F' of the rotational torque applied to the shuttle ring 220 balances the spring force $F_o$ of the bias spring 232. Upon releasing rotational torque applied to the shuttle ring, the pin 231 is returned to section 222a of the cam hole 222 by the spring force of the bias spring 232. Accordingly, the rotary disc 221 is rotated through the corresponding angle $+\theta_1$ and returned to the predetermined initial angular position in response to release of the rotational torque on the shuttle ring.

The rotary disc 221 is formed with through openings 224 and 225 which are located so as to be aligned with the holes 204 and 205 of the base 201 when the rotary disc is in the initial angular position.

Figure 10:
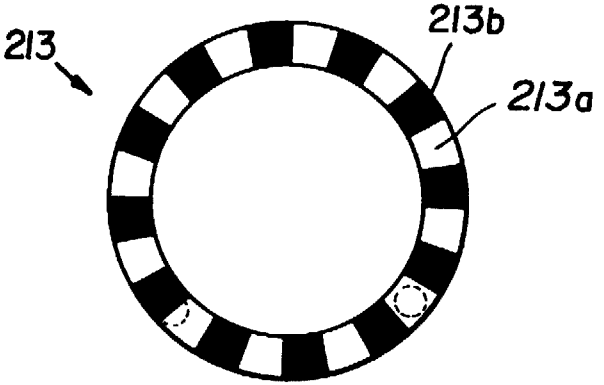
FIG. 10 is a plan view of a reflector plate which is composed of a plurality of reflecting segments and a plurality of non-reflecting segments arranged alternatively.

The dial disc 210 has an annular extension 212 extending from its periphery toward the base. The inner periphery 212a of the annular extension 212 is polygonal, e.g. a dodecagon. The inner periphery 212a acts as a cam surface along which a cam roller 233 mounted on the pin 231 tracks. The cam roller 233 is resiliently biased toward the cam surface 212a by the spring force of the bias spring 232. This resilient contact between the cam roller 233 and the cam surface 212a serves to provide a detentive action for rotation of the dial disc 210.

the dial disc 210 also has a surface opposing the optical sensors 21, 22 and 23, to which an annular reflector sheet or plate 213 adheres. The surface of the reflector plate 213 opposing the optical sensors 21, 22 and 23 consists of a plurality of reflecting segments 213a and a plurality of non-reflecting segments 213b, as shown in FIG. 10. The reflecting segments 213a and the non-reflecting segments 213b alternate along the periphery of the reflector plate 213. In the preferred embodiment, the reflecting and non-reflecting segments 213a and 213b are of identical shape and each covers 1/24of the circumference of the reflector plate 213.

Figure 11:
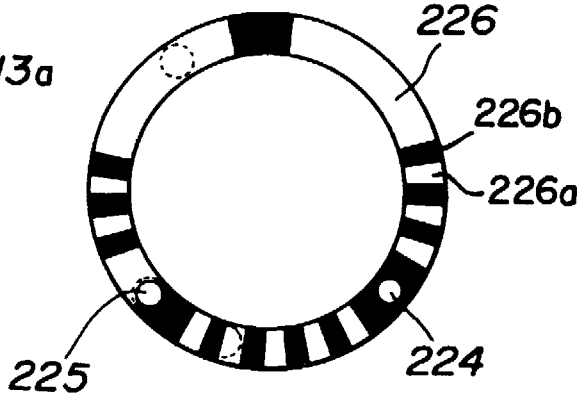
FIG. 11 is a plan view of another reflector plate which is composed of a plurality of reflecting segments and a plurality of non-reflecting segments arranged alternatively.

Similarly, the rotary disc 221 has a surface opposing the optical sensors 21, 22 and 23 to which an annular reflector sheet or plate 226 adheres. The surface of the reflector plate 226 opposing the optical sensors 21, 22 and 23 consists of a plurality of reflecting segments 226a and a plurality of non-reflecting segments 226b, as shown in FIG. 11. The reflecting segments 226a and the non-reflecting segments 226b alternate along the periphery of the reflector plate 226.

Each of the optical sensors 21, 22 and 23 comprises a photo-interrupt having a light-emitting diode and a photo-transistor. The optical sensors 21 and 22 monitor angular variation of the dial disc 210 and produce first and second sensors signals which have signal phases offset from one another by 90°. The optical sensor 23 monitors angular variation of the rotary disc 231 and thus monitors angular variation of the shuttle ring 220.

Figure 12:
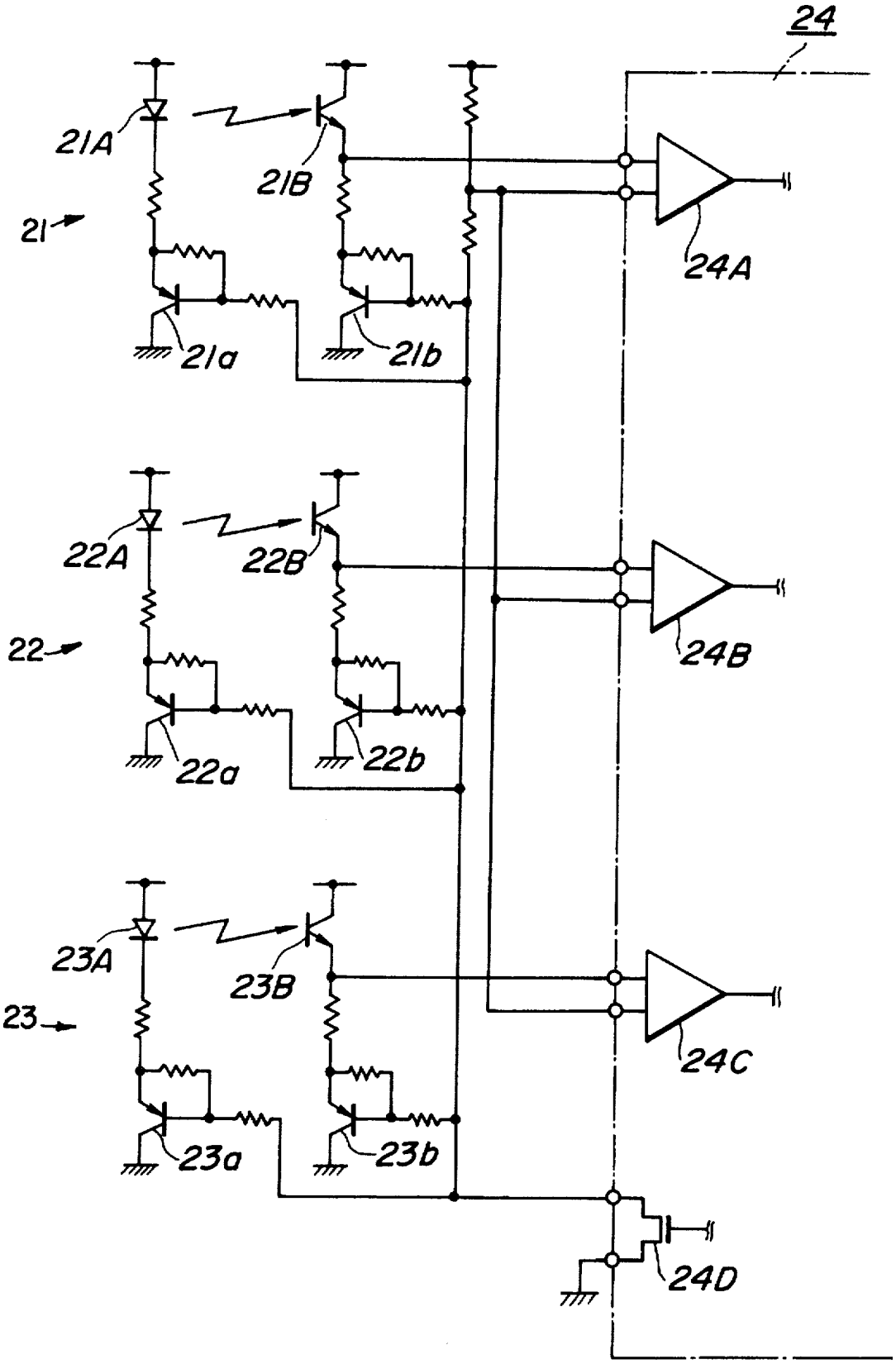
FIG. 12 is a circuit diagram showing connection of photosensors employed in the rotary dial assembly.

As shown in FIG. 12, the photosensors 21, 22 and 23 comprise luminous diodes 21A, 22A, 23A and photo-transistors 21B, 22B and 23B. The luminous diode 21A and the photo-transistor 21B forming the photosensor 21 are respectively grounded through transistors 21a and 21b. The emitter electrode of the photo-transistor 21B is connected to one input terminal of an input comparator 24A of the dial encoder 24. Similarly, the luminous diode 22A and the photo-transistor 22B forming the photosensor 22 are respectively connected to ground through transistors 22a and 22b. The emitter electrode of the photo-transistor 22B is connected to one input terminal of an input comparator 24B of the dial encoder 24. Further similarly, the luminous diode 23A and the photo-transistor 23B forming the photosensor 23 are respectively connected to ground through transistors 23a and 23b. The emitter electrode of the photo-transistor 23B is connected to one input terminal of an input comparator 24C of the dial encoder 24.

On the other hand, base electrodes of the transistors 21a, 21b, 22a, 22b, 23a and 23b are connected to the open-drain output port 24D of the dial-encoding microcomputer 24 and, in turn, connected to a power source terminal (not shown). Preferably, dividing resistors should be inserted between the power source terminal and the base electrode of the transistors 21a, 21b, 22a, 22b, 23a and 23b.

Figure 13:
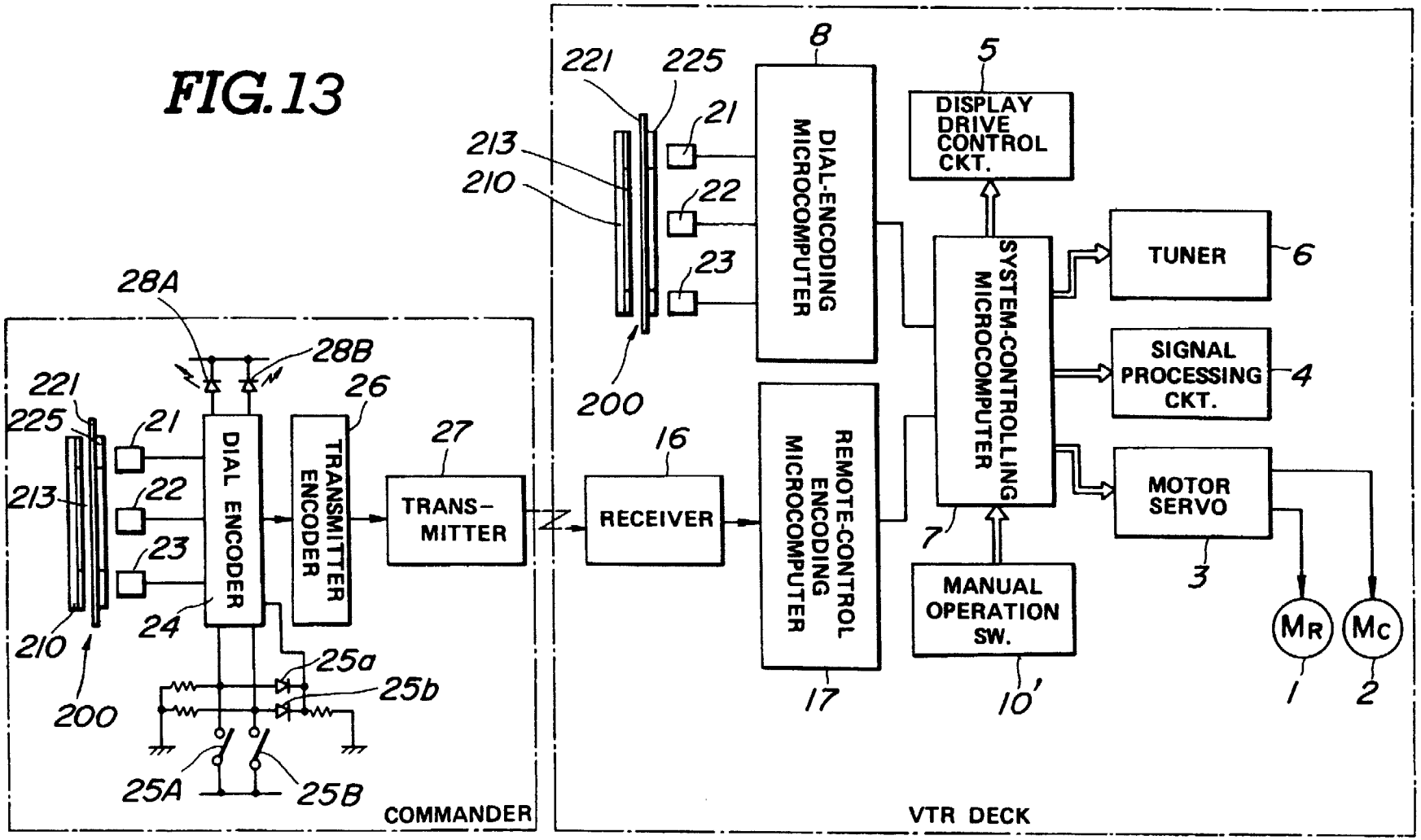
FIG. 13 is a block diagram of a VTR circuit and a commander circuit employed for implementing various remote control functions by means of the preferred embodiment of the remote-controlling commander of FIG. 1.

As shown in FIG. 13, the optical sensors 21, 22 and 23 of the rotary dial assembly 200 in the VTR deck 10 are connected to a dial-encoding microprocessor 8. The dial-encoding microprocessor 8 is associated with a controlling microprocessor 7. The controlling microprocessor 7 is connected to a display drive circuit 5, a tuner circuit 6, a signal processing circuit 4 and a motor servo circuit 3 which is, in turn, connected to a reel motor 1 and a capstan motor 2. The controlling microprocessor 7 is also connected to the manual operation switches 10, including the power switch $\mathbf{10}_A$, the mode selector $\mathbf{10}_B$, the playback button switch $\mathbf{10}_C$, the fast-forward button switch $\mathbf{10}_D$, the stop button switch $\mathbf{10}_E$, the pause button switch $\mathbf{10}_F$, the clock set button switch $\mathbf{10}_a$, the timer set mode selector $\mathbf{10}_b$, the timer recording ON/OFF button switch $\mathbf{10}_c$, the next item selector $\mathbf{10}_d$, the clear button switch $\mathbf{10}_e$ and the item-back button switch $\mathbf{10}_f$.

It should be appreciated that, although the shown embodiment employs a dial-encoding to apply the outputs from the optical sensors 21, 22 and 23 to the controlling controller, it would be possible to employ a waveform-shaping circuit or circuits for producing rectangular wave pulses based on the optical sensor outputs as a replacement for the dial-encoding microprocessor.

The controlling microprocessor 7 controls the signal processing circuit 4 which processes video signals and audio signals in a per se well-known manner in accordance with the desired recording and reproducing mode selected by means of the manual operation switches 10'. The controlling microprocessor 7 also controls the tuner circuit 6 which selects a TV channel in a per se well-known manner for recording of the desired TV program or for sending video and audio signals to a TV monitor for direct reproduction. The motor servo circuit 3 is controlled by the controlling microprocessor 7 to drive the reel motor 1, the capstan motor 2 and so forth. Although it is not clearly illustrated in the drawings, the motor servo control circuit 3 may also control a servo system for a VTR cassette loading system, an ejection system, and a rotary head drive.

The display drive control circuit 5 is also connected to the controlling microprocessor 7 for controlling the display 112. As shown in detail in FIG. 5, the display 112 includes a column 112a serving as the real-time counter, a column 112b serving as the clock counter, columns 112c and 112d for calendar displays, a column 112e for designation of the week or weeks in which to perform timer-activated recording, which may display 'THIS WEEK', 'NEXT WEEK', 'AFTER NEXT' in the case of a VTR recorder which allows timer-activated recording over a three-week period, a column 112f for indicating designation of timer-activated recording 'EVERY WEEK' at a set time and day of the week and at a designated TV channel, a column 112g for indication of the selected TV channel, a column 112h for indication of stereo reproduction, and a column 112i for indication of an index scan. The columns 112b and 112d are associated with each other to display day of the week and clock time during all normal operations of the VTR system except for TIMER SET MODE. The display 112 may also include a column 112j for indication of the recording tape type, e.g. I, II, III as indicated by phantom lines in FIG. 5. Also, the display 112 may have a column 112k for indicating presence or absence of a VTR tape cassette as illustrated by phantom lines in FIG. 5. In a TIMER SET MODE, the column 112a accompanies the column 112c and serves as an indicator for the start time of the timer-activated recording. Similarly, the column 112b cooperates with the column 112d and serves as an indicator for the recording end time when setting the timer.

On the other hand, the optical sensors 21, 22 and 23 of the rotary dial assembly 200 in the remote-controlling commander 20, are connected to a dial encoder 24 in the commander (FIG. 13). The dial encoder 24 is also connected to push button 25A, 25B . . . in the push [putton] *button* array 25 on the commander 20. The dial encoder 24 is further connected to the indicators 28 for controlling illumination thereof for indicating an operating condition of the commander 20. The dial encoder 24 produces an encoded signal for commanding operation of the VTR according to manual operation of the push button array 25 and the rotary dial assembly 200. The encoded signal of the dial encoder 24 is fed to a transmitter encoder 26 which is, in turn, connected to an infrared light beam transmitter 27. The transmitter encoder 26 thus processes the encoded signal from the dial encoder 24 to form the control command, by which an infrared light beam emitted from the transmitter 27 is modulated. The infrared light beam modulated with the control command will be hereafter referred to as 'command beam'. The command beam emitted through the transmitter 27 is received by the receiver 16 of the VTR deck. The receiver 16 feeds the received commander beam to a remote-control encoding microcomputer 17. The remote-control encoding microcomputer 17 demodulates the command beam to extract a control command therefrom and feeds the control command to the system controlling microcomputer 7. The system controlling microcomputer then becomes active for operating the VTR deck in the operation mode commanded by the control command received from the remote-controlling commander 20.

Figure 14:
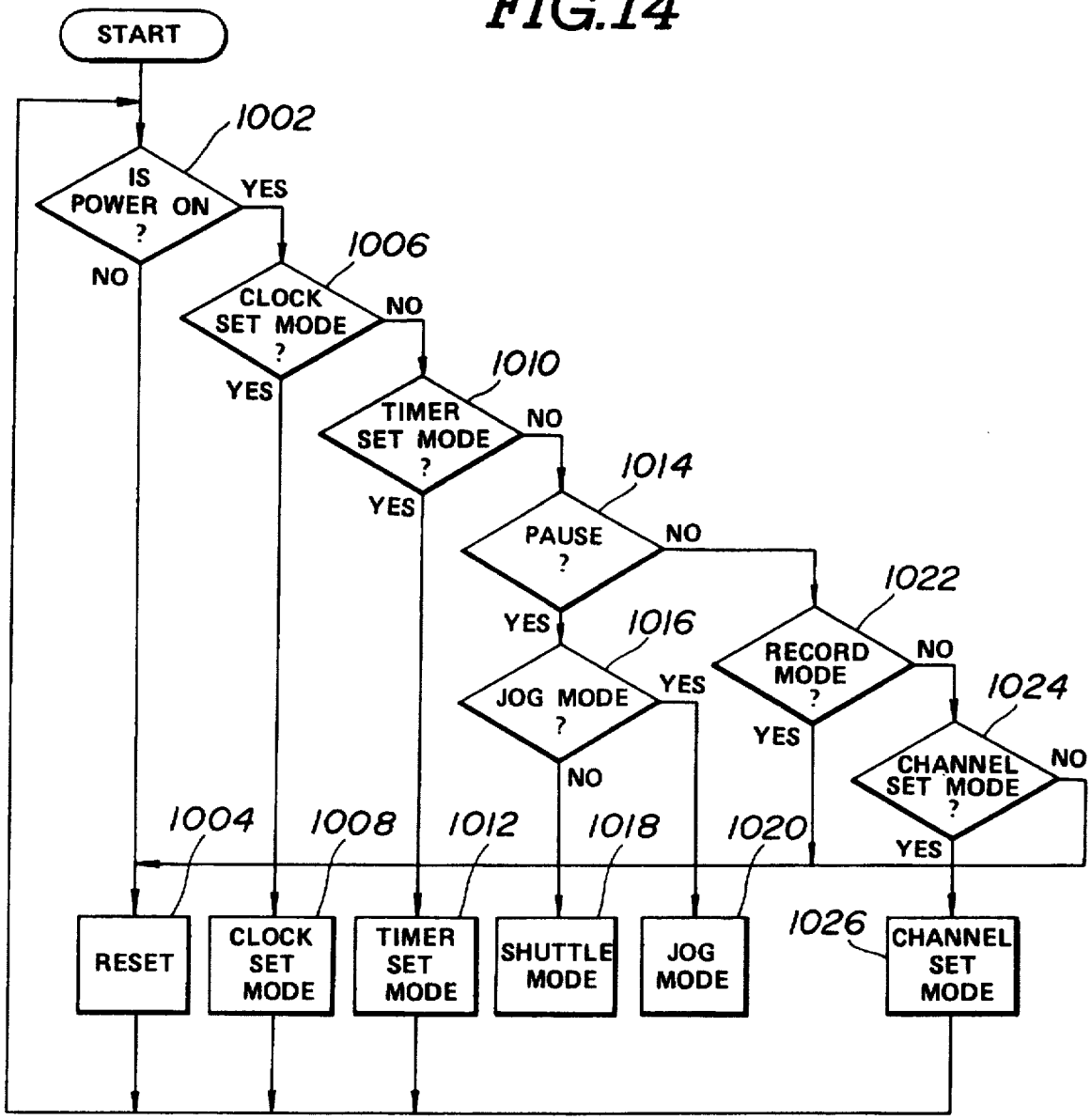
FIG. 14 is a flowchart of an input control program to be executed by the preferred embodiment of the rotary dial assembly.

As set out above, the rotary dial assembly performs three functions, i.e. timer setting, manual scanning and adjustment of playback speed. In addition, the rotary dial assembly allows TV channel selection while the TV tuner in the VTR system is active. In order to selectively perform the desired mode of operation through the jog dial assembly 200 of the VTR deck 10, the program shown in FIG. 14 is executed by the system controlling microcomputer 7. As will be appreciated from FIG. 14, the shown control program is executed cyclically at a given preselected timing even if the main power switch of the VTR unit is OFF.

First, at step 1002, the main power switch is checked to see whether or not it is in the ON position. If the main power switch is OFF, the system controlling microcomputer 7 is reset at a step 1004 and then control returns to the step 1002.

On the other hand, if the main switch is ON when checked at the step 1002, then the clock set switch $\mathbf{10}_a$ is checked at a step 1006. If the clock set switch $\mathbf{10}_a$ has been set to the ON position, the microcomputer allows setting of the clock according to rotational manipulation of the rotary dial assembly 200. In other words, at a step 1008, CLOCK SET MODE is performed. On the other hand, if the clock set switch $\mathbf{10}_a$ is OFF, then the timer set switch $\mathbf{10}_b$ is checked at a step 1010. If the timer set switch $\mathbf{10}_b$ has been set to the ON position, the microcomputer allows the timer to be set according to rotational manipulation of the rotary dial assembly 200. In other words, at step 1012, TIMER SET MODE is performed. On the other hand, if the timer set switch $\mathbf{10}_b$ is OFF, then the playback button switch $\mathbf{10}_A$ and the pause button switch $\mathbf{10}_C$ are checked at a step 1014. If both the playback button switch $\mathbf{10}_A$ and the pause button switch $\mathbf{10}_C$ are ON, which means that the VTR unit is in playback-pause position, then the output of the optical sensor 23 is checked at a step 1016 is see whether or not the shuttle ring 220 is being rotated. If so, the process goes to a step 1018 to perform SHUTTLE MODE. Otherwise, the process goes to a step 1020 to perform JOG MODE.

On the other hand, if the playback-pause position is not detected when checked at the step 1014, then the record button switch (not shown) is checked at step 1022. If the record button switch is ON and thus the RECORD MODE operation of the VTR unit is detected, the microcomputer is reset at step 1004 and control returns to the step 1002. Otherwise, the input selector switch 105 is checked at a step 1024. If the TV tuner has been selected by means of the input selector switch 105, then CHANNEL SET MODE is performed at a step 1026. If the input selector switch 105 is in its LINE/PCM MODE position, then control passes to the step 1004.

Hereafter, the operation of the rotary dial assembly 200 in CLOCK SET MODE, TIMER SET MODE, SHUTTLE MODE, JOG MODE and CHANNEL SET MODE will be described.

CLOCK SET MODE OPERATION

(Step 1008)

Figure 5:
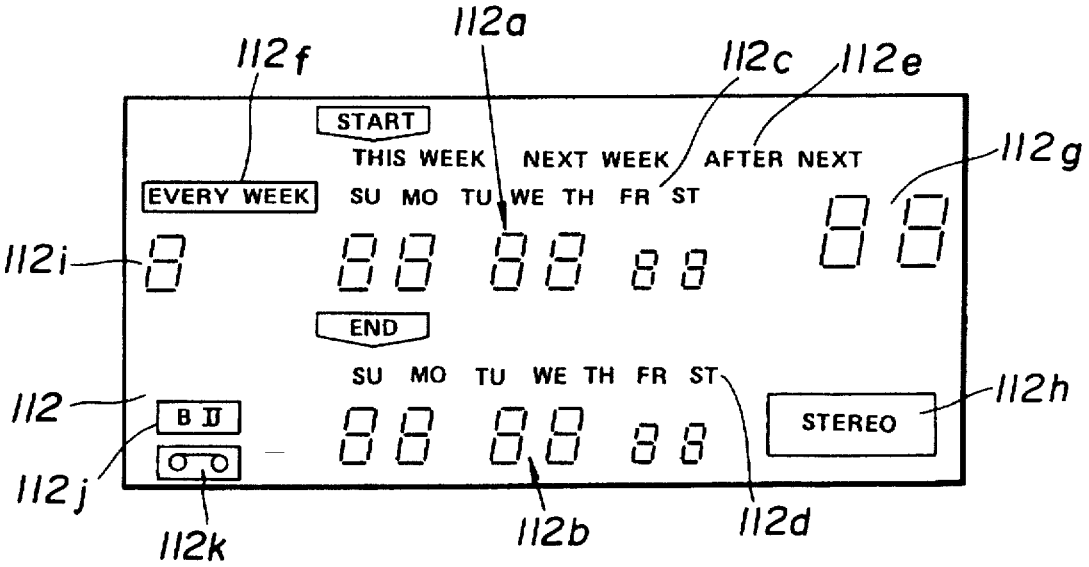
FIG. 5 is an enlarged front elevation of a display on the front panel of the VTR deck of FIG. 1.
Figure 18:
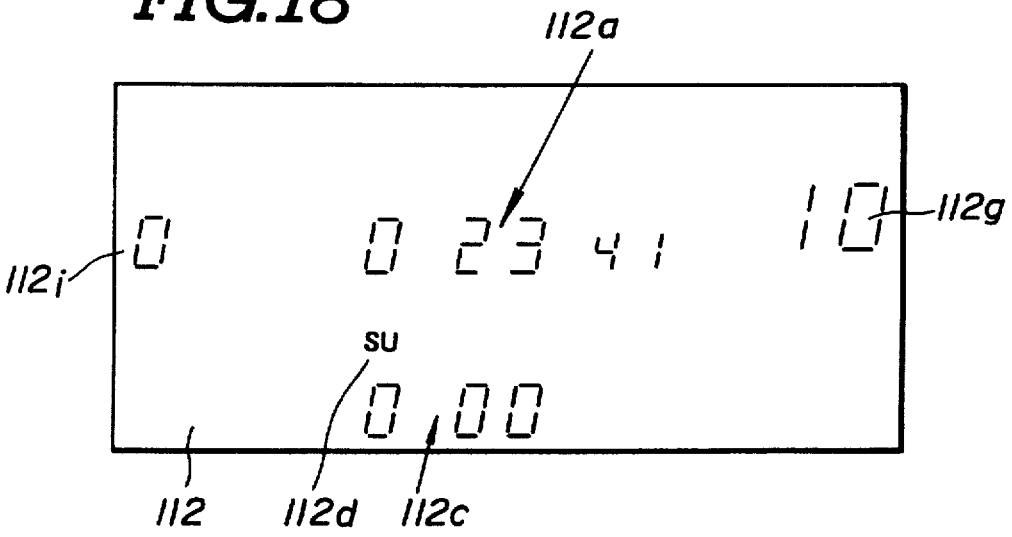
FIG. 18 shows the display when serving as a tape indicator, a TV-channel indicator and a clock indicator.

As shown in FIGS. 5 and 18, the clock time is displayed in the columns 112b and 112d. When it becomes necessary to set the clock, the power cord is first plugged into a wall outlet, whereupon a predetermined clock time, e.g. 'SU' and 'AM 12:00' which means 12:00 AM Sunday, is displayed on the display 112. In order to set the clock to the current clock time, the push button 113 is depressed to move the rotary dial assembly 200 to its horizontal position then the clock set switch $\mathbf{10}_a$ is depressed to enter CLOCK SET MODE.

After depressing the clock set switch $\mathbf{10}_a$, first, the week indicator in the column 112d starts blinking. The dial disc [20] *210* can then be manually rotated to select the day of the week. In this case, when the dial disc 210 is rotated clockwise, a weekday indicator is advanced; for example, the SU symbol may stop blinking while the MO (Monday) symbol starts blinking. On the other hand, when the dial disc 210 is rotated counterclockwise, the direction of advance is reversed. After the correct day of the week is selected, the next item selector button $\mathbf{10}_d$ is depressed. Then, the day indicator stops blinking and the hour indicator in the column 112b starts to blink. The dial disc 210 can again be rotated either clockwise or counterclockwise to adjust the currently selected hour symbol together with an indication of AM/PM. After the correct hour and correct AM/PM has been selected, the next item button $\mathbf{10}_d$ is again depressed. As a result, the hour indicator stops blinking and the minutes indicator in the column 112b start blinking. The dial disc 210 can then be rotated clockwise or counterclockwise to select the minutes symbol which correctly indicates the current time. By depressing the next item selector button $\mathbf{10}_d$ again, the CLOCK SET MODE ends and then the set clock time is indicated on the column 112b and 112d of the display 112.

Figure 15:
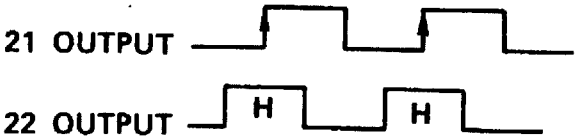
FIGS. 15 and 16 show the relationships between outputs of optical sensors for indicating the direction of rotation of a rotary dial in the preferred embodiment of the rotary dial assembly.
Figure 16:
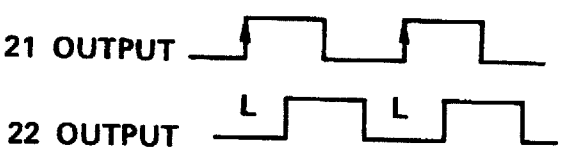

Also as set out above, since the output phases of the optical sensors 21 and 22 differ by 90°, the direction of rotation of the dial disc 210 can be sensed by checking the signal phase of the optical sensor 22 at the leading edge of each HIGH-level output from the optical sensor 21. In the preferred embodiment, the optical sensors 21 and 22 are arranged in such a manner that, when the dial disc 210 is rotated clockwise, the signal phase of the output of the optical sensor 22 will be HIGH at the leading edge of a HIGH-level pulse from the optical sensor 21, as shown in FIG. 15, and when the dial disc 210 is rotated counterclockwise, the signal level of the output of the optical sensor 22 will be LOW at the leading edge of HIGH-level pulses from the optical sensor 21, as shown in FIG. 16. Therefore, the system controlling microcomputer 7 distinguishes between directions of rotation of the dial disc 210 by detecting the signal phase of the optical sensor 22 at the time that the output of the optical sensor 21 rises. The system controlling microcomputer 7 also derives rotation speed of the dial disc according to the pulsewidths, e.g. $t_1$, $t_2$, $t_3$, $t_4$, $t_5$, $t_6$ and $t_7$ in FIG. 17. The system controlling microcomputer 7 compares the derived rotation speed of the dial disc 210 with a predetermined threshold and appropriately adjusts the rate of change of the numbers on the display 112. For example, in order to adjust the minutes value of the clock time, when the dial disc 210 is rotated at a relatively low speed, the minutes value will change by '1' with every given angle of dial rotation, and, on the other hand, when the dial disc 210 is rotated at a relatively high speed, the minutes value will change by more than '1', e.g. by '2' with every given angle of dial rotation. This reduces the required angular change needed to reach the desired number. This is convenient when a relatively large adjustment is required. In addition, since the rate of change can be adjusted automatically according to the rotation speed of the dial disc 210, it allows fine adjustment of the number by slowing down the rotation speed after coarse adjustment by way of high-speed rotation of the dial disc.

TIMER SET MODE

(Step 1012)

As is well known, the TIMER SET MODE is employed to set up timer-activated recording, i.e. to set the record start time, record end time, day of the week, TV channel to be recorded and so forth. To set the timer, first, the push button 113 is depressed as in the clock setting operation, to move the rotary dial assembly 200 to its horizontal position. Thereafter, the timer set button $\mathbf{10}_b$ is depressed to enter the TIMER SET MODE.

It should be appreciated that, in the TIMER SET MODE operation, the columns 112a and 112c of the display serve as a record start time indicator, and the columns 112b and 112d serve as a record end time indicator.

Figure 19:
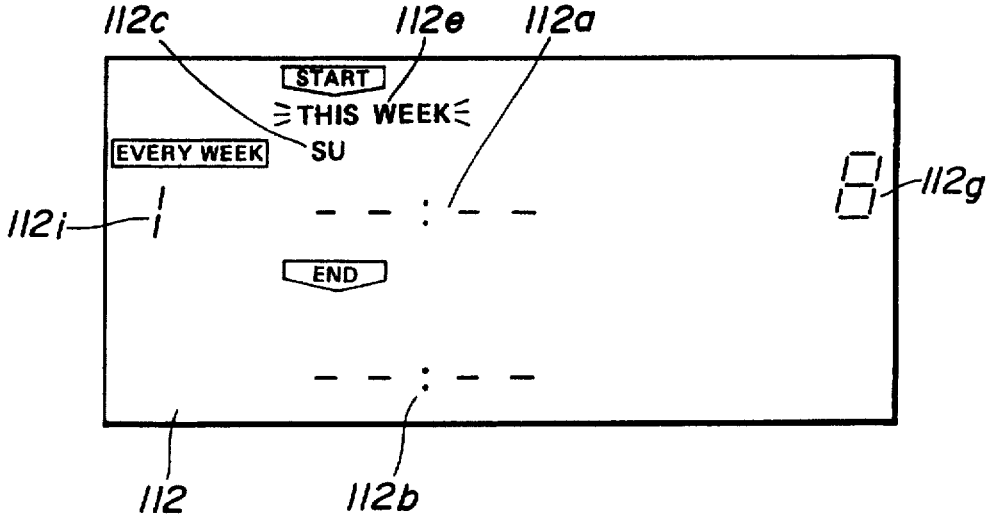
FIG. 19 shows the display in TIMER SET MODE.

After depressing the timer set button, the system controlling [microcomuter] *microcomputer* 7 enters the TIMER SET MODE. In response to this, the column 112e indicative of the desired week at which the timer-activated recording is ordered starts blinking as shown in FIG. 19. Specifically, one of the symbols 'THIS WEEK', 'NEXT WEEK', 'AFTER NEXT' and 'EVERY WEEK' which will be indicating the day of the week starts blinking as in the CLOCK SET MODE. The day of the week and the record start time can be selected in basically the same manner as when setting the clock as explained above.

After setting the record start time, in response to depression of the next item selector button $\mathbf{10}_d$, the hour symbol in the column 112b starts blinking. As in the CLOCK SET MODE, the hour symbol and minutes symbol in the column 112b may be selected to set the record end time. Upon depressing the next item selector button $\mathbf{10}_d$ after setting the minute value in column 112b, a TV channel symbol in column 112g starts blinking. By rotating the dial disc 210, the number displayed in the column 112g is advanced or retarded according to the direction and magnitude of rotation of the dial disc 210. As described previously, the rate of change of the number is adjusted depending upon the rotation speed of the dial disc. When the number of the desired TV channel is obtained on the column 112g, the next item selector button $\mathbf{10}_d$ is depressed. Then, TIMER SET MODE ends.

In order to perform timer-activated recording, the timer recording ON/OFF button switch $\mathbf{10}_c$ is depressed subsequent to selection of the record start time, record end time and TV channel to be recorded in TIMER SET MODE. The system controlling microcomputer 7 then enters a timer-activated recording mode. In VTR systems now on the market, upon entry into the timer-activated recording mode, the main power switch is automatically turned OFF and the VTR system will not accept entry of inputs through manual switches except for the timer recording ON/OFF switch $\mathbf{10}_c$ and another switch (not shown) used to confirm the timer setting. The timer record ON/OFF switch $\mathbf{10}_c$ then serves as a timer-activated recording.

SHUTTLE MODE

(Step 1018)

SHUTTLE MODE can be performed in the playback-pause position to cause the VTR tape to be played back at one of 5 preset tape speeds ranging from one fifth of normal speed to four times normal speed. In the playback-pause position, the picture on the TV monitor is frozen. By grasping and rotating the shuttle ring 220 under these conditions, picture search or scanning can be performed at a speed which is variable depending upon the angular offset of the shuttle ring. Also according to the direction of rotation of the shuttle ring 220, forward scan or reverse scan can be performed selectively. According to the preferred embodiment, by rotating or turning the shuttle ring 220 clockwise, forward scan can be performed. On the other hand, by turning the shuttle ring 220 counterclockwise, reverse scan can be performed.

The shuttle ring 220 can be turned or rotated clockwise and counterclockwise through respective given angles. According to the angular position of the rotary disc 221 rotated according to rotation of the shuttle ring 220, forward and reverse variable-speed picture search can be performed as set forth above. Also, relatively high-speed scanning (which is referred to as CUE REV) can be performed by rotating the shuttle ring 220 to its limit.

Figure 20:
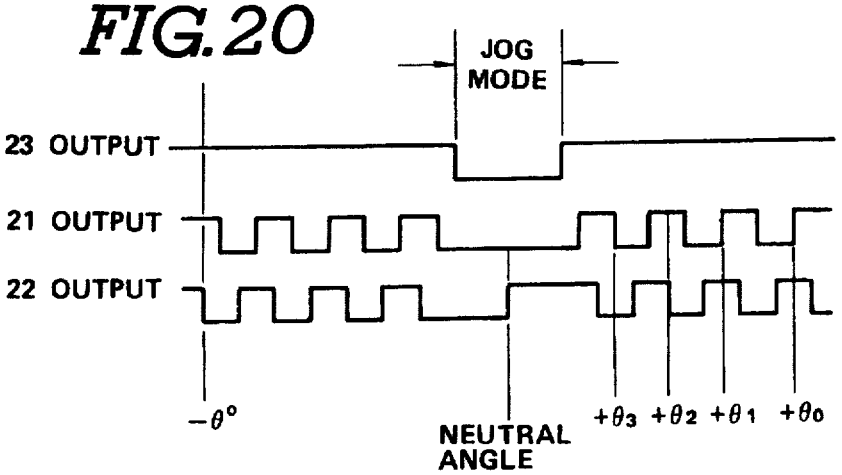
FIG. 20 shows the relationships among outputs of three optical sensors for distinguishing JOG MODE operation from SHUTTLE mode operation.

The dial-encoding microcomputer 8 distinguishes between JOG MODE and SHUTTLE MODE according to the angular position of the rotary disc 221. Outputs of the optical sensors 21, 22 and 23 are related as shown in FIG. 20. As will be appreciated herefrom, JOG MODE is performed within a given angular range of the neutral position of the rotary disc 221. That is to say, while the rotary disc 221 is within an angular range in which the output of the optical sensor 23 remains low, SHUTTLE MODE is disabled. When the shuttle ring 220 is rotated clockwise or counterclockwise out of the given angular range, the output of the optical sensor 23 becomes HIGH. At the same time, according to rotation of the rotary disc 221, the optical sensors 21 and 22 output pulses having a 90° phase-shifted relation to each other. As shown in FIG. 20, the relationships between the pulses of the optical sensors 21 and 22 determining playback speed in the presence of a HIGH-level output from the optical sensor 23 are represented by the angular positions $\theta_3$, $\theta_2$, $\theta_1$ and $\theta_0$ of FIG. 20. In the shown embodiment, the relationship between playback speed, the rotary disc's angular position, and phases of the outputs of the optical sensors 21 and 22 are so arranged as to conform with the following table 1:

TABLE 1

| Angle | θ3 | θ2 | θ1 | θ0 |
|---|---|---|---|---|
| 21 Output | LOW | HIGH | LOW | HIGH |
| 22 Output | LOW | LOW | HIGH | HIGH |
| Playback Sp. | 1/5 | 1/1 | 2/1 | CUE REV |

JOG MODE

(Step 1020)

Figure 17:
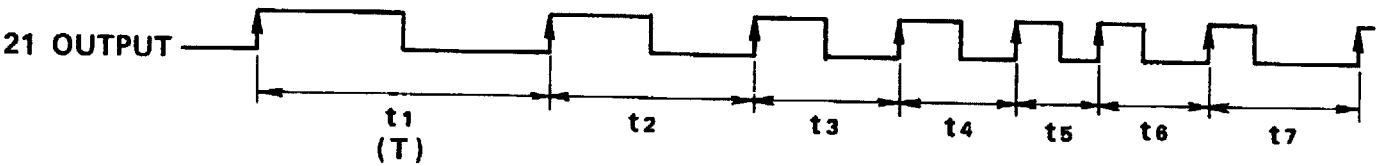
FIG. 17 is a diagram of the variation of the pulse duration according to rotation speed of the rotary dial.

As set forth above, when the shuttle ring 220 is not manipulated and thus the rotary disc [21] *221* is in the neutral angle range as shown in FIG. 11, the JOG MODE is performed. In JOG MODE, the playback speed of the tape is adjusted depending upon the rotation speed of the dial disc 210. As set forth with respect to CLOCK SET MODE, the controlling microcomputer 7 distinguishes between clockwise rotation and counterclockwise rotation of the dial disc 210 depending on the phases of the outputs of the optical sensors 21 and 22. Also, the system controlling microcomputer 7 controls playback speed according to rotation of the dial disc 210 according to the following table 2, in which T represents the pulse period of the sensor output such as is shown in FIG. 17:

TABLE 2

| T | T > t1 | t1 < T < t2 | t2 < T < t3 | t3 < T |
|---|---|---|---|---|
| 21 Output | HIGH | LOW | HIGH | LOW |
| 22 Output | HIGH | HIGH | LOW | LOW |
| Playback Sp. | X2 | X1 | SLOW | FIELD |

The reference value $t_1$ is shorter than $t_2$ which is shorter than $t_3$. When the dial disc is rotated at a speed higher than a high-speed threshold represented by the reference time $t_1$, causing the pulse duration of the output of the optical sensor 21 to be shorter than reference time $t_1$, playback speed will be set to twice the normal playback speed. On the other hand, when frame advance is desired, the dial disc 210 is rotated at a relatively low speed. As a result, the pulse duration T of the optical sensor 21 becomes longer than the reference time $t_3$. Therefore, the system controlling microcomputer 7 advances the image on the TV monitor frame-by-frame with each given angle of dial disc rotation.

CHANNEL SET MODE (Step 1026)

The system controlling microcomputer 7 is normally ready for CHANNEL SET MODE unless one or more of the other operation modes described above are ordered and is always ready when the input selector switch 105 is set to the TV tuner position.

In CHANNEL SET MODE, the channel is selected in substantially the same manner as discussed with respect to TIMER SET MODE. Therefore, it is not necessary to explain the CHANNEL SET MODE operation in detail.

Figure 23:
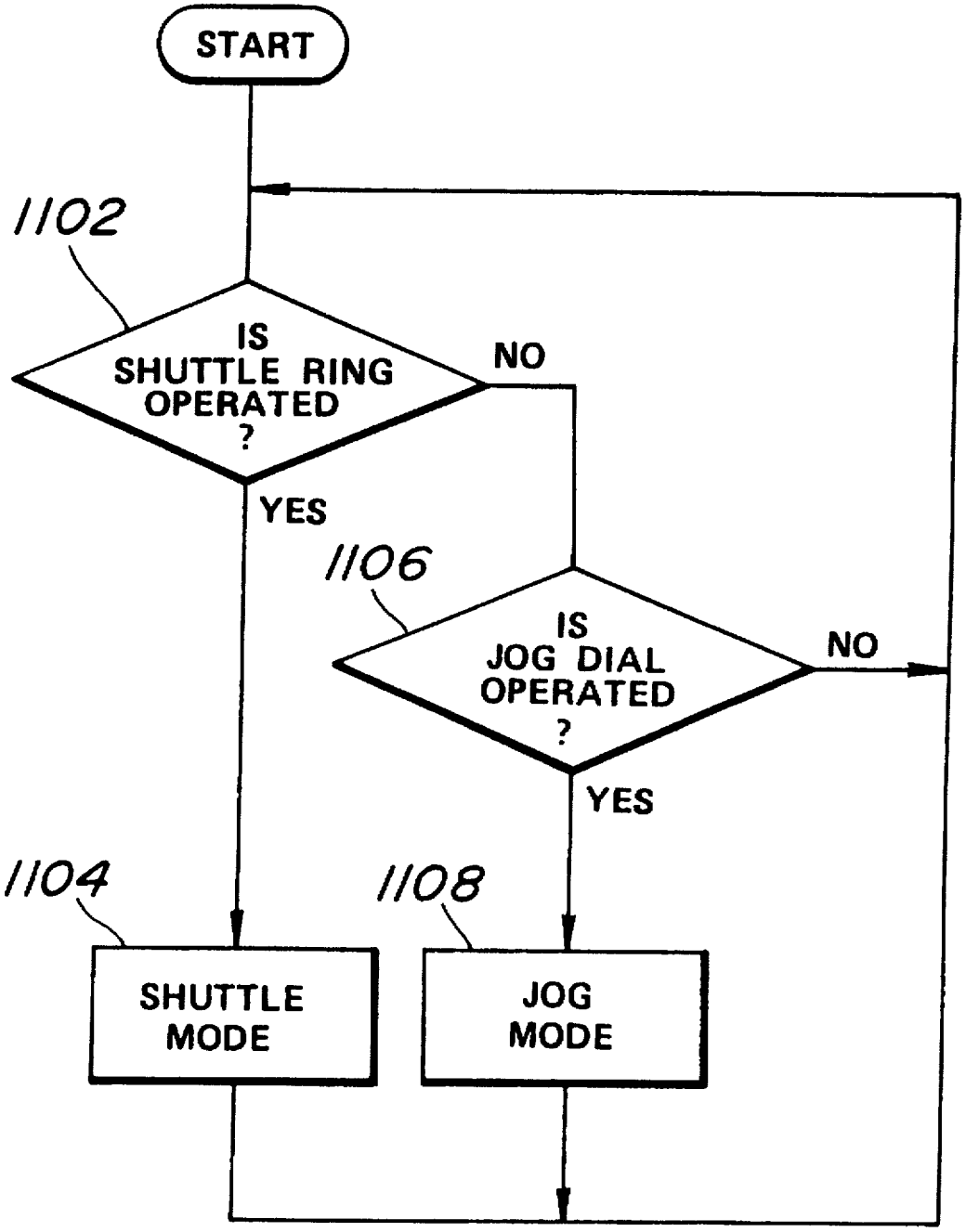
FIG. 23 is a flowchart for an editing program to be executed in the remote-controlling commander for controlling edit operations of a VTR.

FIG. 23 shows a flowchart of an editing program to be executed by the dial-encoding microcomputer 24 in the remote-controlling commander 20, for allowing adjustment of picture-feed speed in reproduction for performing editing operation. In order to trigger the editing program, the JOG/SHUTTLE mode selector switch 25A is manually operated into an ON position. While the JOG/SHUTTLE mode selector switch 25A is in an ON position, the editing program is executed continuously. In the editing operation, the editing point should be found. Therefore, in practical editing operation, the VTR signal reproduction is performed at a higher speed or a lower speed than a normal reproduction speed by manual operation of the [shttle] *shuttle* ring 220 to the angular position corresponding to the desired reproduction speed. The SHUTTLE mode reproduction is terminated when the editing point is found. By termination of the SHUTTLE mode operation, the picture is frozen at the field at which the SHUTTLE mode operation is terminated. After this, the JOG mode operation is performed by means of the dial disc 210 for feeding the picture in forward and reverse directions for precisely setting the tape at the editing point. In the JOG mode operation, the tape feed speed corresponds to rotation speed of the dial disc 210 as set forth above.

Figure 21:
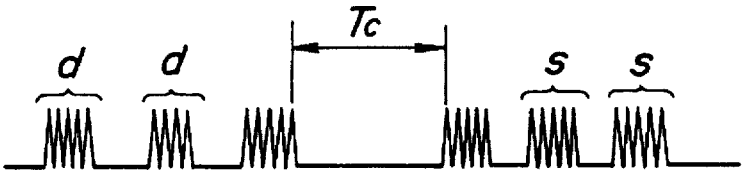
FIG. 21 shows the waveform of an encoded signal to be transmitted from the remote-controlling commander.
Figure 22:
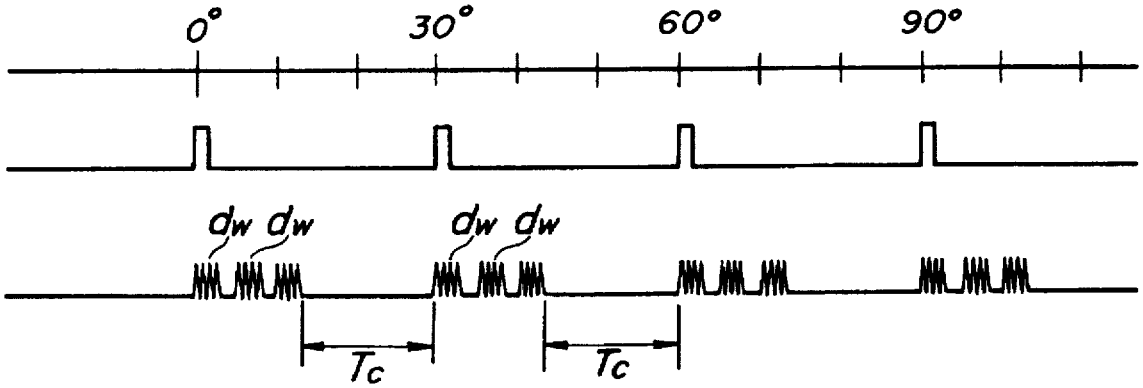
FIG. 22 is a chart showing the relationship between the angular position of the rotary dial and the encoded signal to be transmitted from the remote-controlling commander.

Therefore, in the execution of the editing program, a check is performed at a step 1102, *to determine* whether the shuttle ring 220 is operated. This is performed by checking outputs of the optical sensors 21, 22 and 23 as set forth with respect to the SHUTTLE MODE operation to be performed in response to manual operation of the shuttle ring 220 of the rotary dial assembly 200 in the VTR deck 10. When angular displacement of the shuttle ring 220 is detected at the step 1102, then SHUTTLE mode operation is commanded by the remote-controlling commander 20, at a step 1104. Then the dial-encoding microprocessor 24 produces the control command containing mode selection data component m and reproduction speed indicative data component s. Therefore, in this case, the output of the dial-encoding microcomputer 24 contains SHUTTLE mode indicative data component m and designated reproduction speed which is determined by magnitude and direction of angular displacement caused in the shuttle ring 220, indicative data component s is also contained in the control command. The transmitter encoder 26 receives the control command from the dial-encoding microcomputer 24 and generates the infrared control command indicative signal modulated by the control command. Therefore, the encoded infrared signal contains the mode selection data component m and the reproduction speed indicative component s as shown in FIG. 21. As will be appreciated from FIG. 21, the mode selection data component m and the reproduction speed indicative components are separated by a [chanel-time] *channel-time* Tc. The infrared signal thus formed is transmitted through the transmitter 27. The receiver 16 of the VTR deck 10 receives the transmitted infrared signal modulated by the control command and feeds the output thereof to the remote-control encoding microcomputer 17. The remote control encoding microcomputer 17 thus outputs a control command containing the mode selection data component m and the reproduction speed data indicative component s as that produced by the dial encoding microcomputer 24, to feed the same to the system controlling microcomputer 7. The system controlling microcomputer 7 is responsive to the control command from the remote-control encoding microcomputer to perform SHUTTLE mode operation as that commanded through shuttle ring 220 of the rotary dial assembly 200 facilitated in the VTR deck 10.

On the other hand, when angular displacement of the shuttle ring 220 is not detected as checked at the step 1102, then a check is performed whether the rotary dial disc 210 is rotatingly operated, at a step 1106. When the rotary dial disc 210 is not operated, the process returns at the step 1102 to form a loop of the steps 1102 and 1106 for [maintain] *maintaining* a stand-by state, as long as the remote-controlling commander 20 is maintained in JOG/SHUTTLE mode.

Through the shown embodiment of the remote-controlling commander 20 maintains the JOG/SHUTTLE mode and holds the system in a stand-by state for allowing JOG mode or SHUTTLE mode operation until the JOG/SHUTTLE mode selector switch 25A is manually turned OFF, it would be possible to switch the operation mode of the remote-controlling commander 20 automatically of the TIMER/CHANNEL mode from the JOG/SHUTTLE mode after a predetermined period of time, when the rotary dial disc 210 and shuttle ring 220 are not operated during that period. This would be convenient for avoiding a mis-operation which possibly happens due to erroneously maintaining the JOG/SHUTTLE mode selector switch 25A at an ON position.

When angular displacement of the rotary dial disc 210 is detected at the step 1106, the JOG mode operation is commanded at a step 1108. Therefore, the dial encoding microcomputer 24 outputs the control command indicative of the JOG mode indicative data component m and the rotary dial disc position indicative component s. The rotary dial disc position indicative contains direction data toward which the rotary dial disc 210 is rotated and angle data indicative of the angular position of the rotary dial disc. The angle data may be in a form of pulse signals produced at every given angle of angular displacement caused in the rotary dial disc 210. The transmitter encoder 26 is responsive to this control command from the dial encoding microcomputer 24 to generate the infrared signal modulated by the control command to transmit to the VTR deck 10. As set forth with respect to the SHUTTLE mode operation, the infrared signal from the transmitter 27 is received by the receiver 16 in the VTR deck 10 and demodulated by the remote-control encoding microcomputer 17 to be input as the control command to the system controlling microcomputer 7. Therefore, the system controlling microcomputer 7 performs JOG mode operation according to rotation of the rotary dial disc 210 of the rotary dial assembly 200 in the remote-controlling commander 20.

Figure 24:
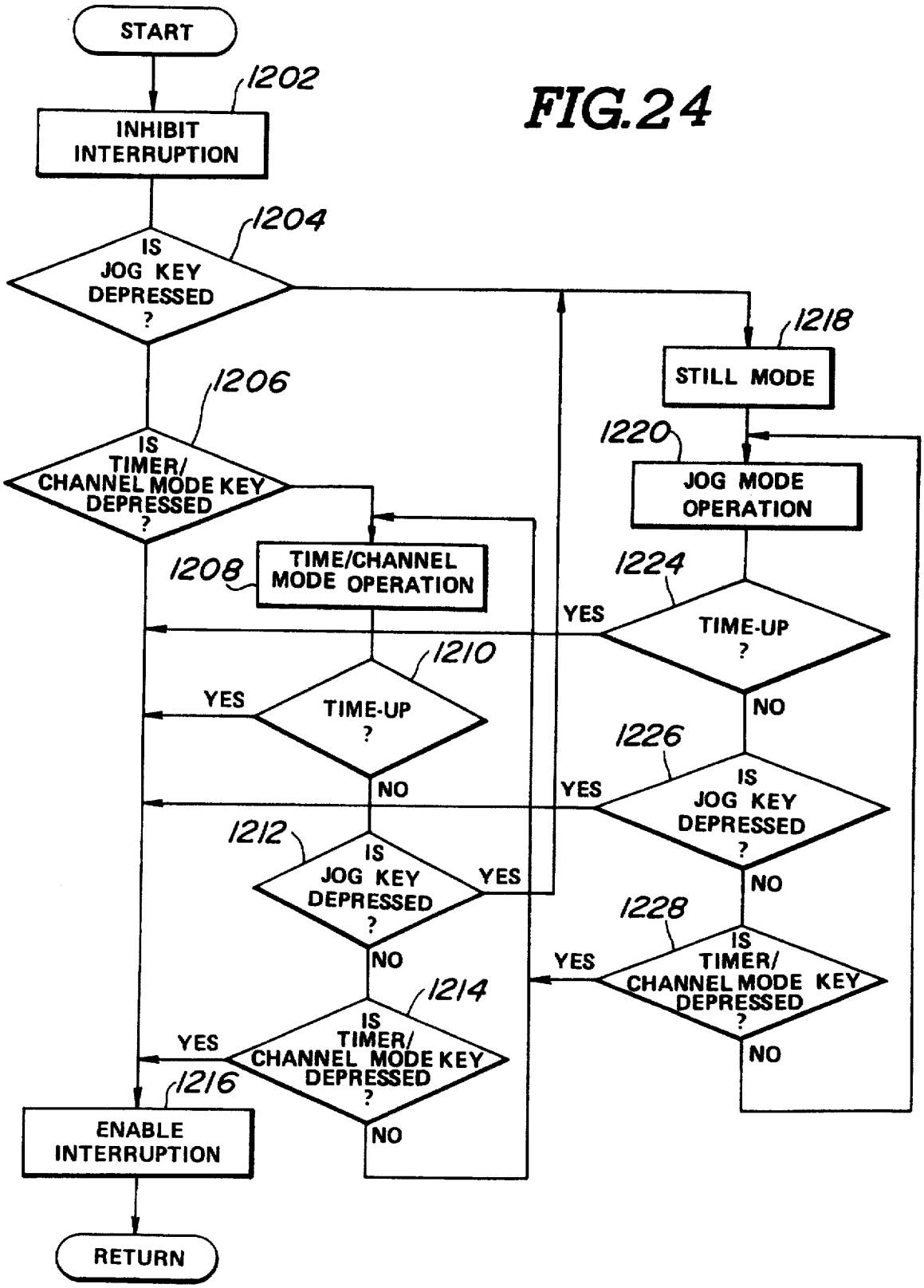
FIG. 24 is a flowchart of a control program to be executed by the remote-controlling commander for timer set, channel selection and variable speed reproduction.

FIG. 24 shows a flowchart of a control program to be triggered in response to a rotating operation of one of the rotary dial disc 210 and the shuttle ring 220 of the rotary dial assembly 200. Immediately after entry into execution, interrupt of execution is inhibited. Therefore in the dial-encoding microcomputer, an interrupt mask flag may be set for preventing the program from interruption a step 1202. Thereafter, at a step 1204, the operation mode of the remote-controlling commander 20 is checked with respect to the JOG/SHUTTLE mode selector switch 25A. Namely, as set forth above, the JOG/SHUTTLE mode is selected while the JOG/SHUTTLE mode selector switch 25A is ON position. Therefore, at the step 1204, the JOG/SHUTTLE mode selector switch position is checked. When the JOG/SHUTTLE mode selector switch 25A is in an OFF position, then the TIME/CHANNEL mode selector switch 25B is checked whether it is operated to the TIMER position or not, at a step 1206.

When the TIMER/CHANNEL mode selector switch 25B is set at the TIMER mode position, as checked at the step 1206, then the TIMER-SET mode operation as set forth above is performed in order to accept a timer-set for starting recording of a TV program at a designated date, time and on a designated TV channel. Thereafter, time-up is checked at 1208. In the step 1208, a period of time while neither the JOG dial 210 nor the SHUTTLE ring 220 is operated is compared with a predetermined time-up threshold to detect the time-up. A check is performed at a step 1210 whether the JOG/SHUTTLE mode selector switch 25A is operated to the ON position at a step 1212. If the JOG/SHUTTLE mode selector switch 25A is held in an OFF position, then the TIMER/CHANNEL mode selector switch 25B is again checked at a step 1214. When the TIMER/CHANNEL mode selector switch 25B is held at a TIMER position, the process returns to the step 1208 to accept another timer-set for another TV program.

When the TIMER/CHANNEL mode selector switch 25B is returned to the CHANNEL mode position as checked at the step 1206 or 1214, interrupt is enabled at a step 1216 and program execution goes to END.

On the other hand, when an ON position of the JOG/SHUTTLE mode selector switch 25A is detected at the step 1204 or 1212, a control command for setting the VTR deck at the STILL mode is output at a step 1218. Therefore, the picture reproduced on the TV monitor is frozen. Then, JOG/SHUTTLE mode operation which has been discussed with respect to the editing program will be performed at a step 1220. After JOG/SHUTTLE mode operation is terminated and thus both of the rotary dial disc 210 and the shuttle ring 220 cease rotation, elapsed time is measured and compared with a time-up threshold, at a step 1222. After detecting time-up at the step 1222, the JOG/SHUTTLE mode switch position is again checked at a step 1224 *to determine* whether it is operated at an OFF position. When the JOG/SHUTTLE mode selector switch 25A is held ON, the process returns to the step 1220 to wait another JOG/SHUTTLE operation. On the other hand, when turning OFF of the JOG SHUTTLE mode selector switch 25A is detected at the step 1224, then the TIMER/CHANNEL mode selector switch 25B is checked whether it is set at the TIMER position or not, at a step 1226. If not, *the* process goes to the step 1216 to enable interrupt and thereafter program execution goes END. On the other hand, when setting at the TIMER position of the TIMER/CHANNEL mode selector switch 25B is detected at the step 1226, the process goes to the step 1208 for performing TIMER-SET operation.

As will be appreciated herefrom, according to the preferred embodiment of the present invention, the remote-controlling commander which can perform channel selection, timer-set, and variable speed of VTR reproduction can be provided with a simplified push-button arrangement. Furthermore, though the foregoing embodiment performs the specific functions as set forth, it would be possible to additionally perform a clock set operation as that can be performed by the rotary dial assembly in the VTR deck.

It should be noted that the remote-controlling commander of the present invention is applicable not only for remote-control of the VTR deck but also any other apparatus or systems, such as videotexs systems, audio systems, television set and so forth.

While the present invention has been disclosed in detail in terms of the preferred embodiment of the invention in order to facilitate better understanding of the invention, the invention may be embodied in various ways without departing from the principles of the invention as set out in the appended claims. Therefore, the invention should be understood to include all possible embodiments and modifications of the invention which do not depart from the principles set forth in the appended claims.

What is claimed is:

1. A system for remotely controlling a video tape recorder which performs different functions including a timer activated recording function as a first function, and second function, comprising:

a controller provided in said video tape recorder for controlling operation of said video tape recorder and selecting operation modes for accomplishing different functions [to] according to a control command;

first means, incorporated in said apparatus and associated with said controller for performing said first function;

second means, incorporated in said apparatus and associated with said controller for performing said second function;

a remote control commander including a push button for selecting operation modes of said apparatus and producing a remote control signal carrying said control command, a rotary dial assembly operable for generating said control command for operating said first and second means selectively for performing said first and second functions;

a mode selector switch for selecting an operation mode of said remote control commander at least among a first position, at which said control command generated by said remote control commander operates said first means for performing said first function, and a second position, at which said control command generated by said remote control [command] *commander* operates said second means for performing said second function; said rotary dial assembly comprising:

a dial manually rotatable at a desired speed in opposing first and second directions;

a first sensing means for monitoring a magnitude *and a direction* of angular displacement of said dial and producing a rotation angle indicative signal *and a direction indicative signal*;

a timer set mode switch manually operable to produce a timer set mode selector signal ordering said video tape recorder system to operate in a timer set mode;

a display for displaying at least symbols representing a timer-activated recording start timing and end timing; and a controller responsive to said timer set mode selector signal for changing the value represented by each of said symbols at a given rate on said display, said given rate being selected on the basis of the values of said direction indicative signal and said [rotating] *rotation* angle indicative signal.

2. A system as set forth in claim 1, wherein said remote control commander includes third means for monitoring angular displacement of a rotary dial in said rotary dial assembly [anmd] *and* producing a command signal representative of *the* angular position of said rotary dial, and fourth means [for] responsive to said command signal from said third means, for encoding a remote control signal to be transmitted therefrom for transmitting said remote control signal carrying said control command.

3. The system as set forth in claim 1, which further comprises a second sensing means for monitoring the rotation speed of said dial and producing a rotation speed indicative signal, and said controller is responsive to said rotation speed indicative signal to adjust said given rate based thereon.

4. The system as set forth in claim 1, wherein said video tape recorder further operates in a picture search mode as said second function, and said remote control commander further comprises means for triggering a picture search mode and producing a command for entry into the picture search mode, and said controller is responsive to said command to perform forward and reverse playback selectively and at a given speed according to rotation of said rotary dial.

5. The system as set forth in claim [1] *4*, in which said remote control commander includes a pause switch for operating said video tape recorder at a pause mode for temporarily stopping playback so as to freeze an image on a television monitor, said pause switch serving as said picture search triggering means.

6. The system as set forth in claim 1, wherein said rotary dial assembly further comprises a ring rotatable independently of said dial and a [fourth] *second* sensing means *for* monitoring the angular position of said ring and producing a shuttle mode selector signal when angular displacement of said ring is detected, and said controller is responsive to said shuttle mode selector signal in the presence of said command for selectively performing forward and reverse playback at a variable playback speed varying in accordance with the direction and magnitude of angular displacement of said ring.

7. The system as set forth in claim 6, wherein said first and second sensing means also cooperate with said ring for monitoring angular displacement of the latter and producing said [rotating] direction indicative signal and said rotation angle indicative signal.

8. The system as set forth in claim 7, wherein said controller is also responsive to rotation of said dial in the presence of said command for performing forward and reverse playback selectively at a given speed according to rotation of said dial.

9. The system as set forth in claim 1, in which said video tape recorder system also has a television tuner for selecting a television channel and in which the selected television channel is indicated on said display, further comprising means for triggering a channel set mode for the video tape recorder system for selecting a television channel, and said controller is responsive to rotation of said dial in said channel set mode to adjust the channel selection according to angular displacement of said dial.

10. The system as set forth in claim 9, which further comprises a second sensing means for monitoring the rotation speed of said dial and producing a rotation speed indicative signal, and said controller is responsive to said rotation speed indicative signal to adjust said given rate in accordance therewith.

11. The system as set forth in claim 9, wherein said controller adjusts [the] *a* rate of change of said television channel in said channel set mode depending upon said rotation speed indicative signal value.

12. The [rotary dial assembly] *system* as set forth in claim [11] *6*, wherein said dial and said ring are associated with a common rotary plate with which said first [, second] and second sensing means are associated for monitoring the direction, magnitude and speed of angular displacement thereof.

13. The system as set forth in claim 12, wherein said dial is further associated with a click mechanism providing a detent action at every given angle of angular displacement, which given angle corresponds to one frame of a video signal.

14. A remote-controlling commander for a video tape recorder system capable of recording and reproducing video signals, performing picture search, and including a television tuner for varying a television channel, comprising:

a rotary dial assembly including a rotary dial manually rotatable at a desired speed in opposing first and second directions;

a first sensing means for monitoring a magnitude *and a direction* of angular displacement of said dial and producing a rotation angle indicative signal *and a direction indicative signal*;

a channel set mode switch manually operable to produce a first mode selector signal ordering said video tape recorder system to operate in a television channel set mode; and an encoder responsive to said first mode selector signal and said rotation angle indicative signal for generating a remote control signal to be transmitted to said video tape recorder for changing a television channel set according to an angular position of said rotary dial.

15. The remote-controlling [command] *commander* as set forth in claim 14, wherein said video tape recorder system includes a controller responsive to said remote control signal encoded by said first mode selector signal and said rotation angle indicative signal for changing the value represented by each of said television channel at a given rate on a display of said video tape recorder system, said given rate being selected on the basis of the values of said direction indicative signal and said [rotating] *rotation* angle indicative signal.

16. The remote-controlling commander as set forth in claim 15, which further comprises a second sensing means for monitoring the rotation speed of said dial and producing a rotation speed indicative signal, and said controller is responsive to said rotation speed indicative signal to adjust said given rate based thereon.

17. The remote-controlling commander as set forth in claim 16, which further comprises means for triggering a picture search mode and producing a command for entry into the picture search mode, and said controller is responsive to said command to perform forward and reverse playback selectively and at a given speed according to rotation of said dial.

18. The remote-controlling commander as set forth in claim 17, which said video tape recorder system includes a pause switch for temporarily stopping playback so as to freeze an image on a television monitor, said pause switch serving as said picture search triggering means.

19. The remote-controlling commander as set forth in claim 18, wherein *said rotary dial assembly further comprises a ring rotatable independently of said dial and* said first and [first] *second* sensing means also cooperate with said ring for monitoring angular displacement of the latter and producing said [rotating] direction indicative signal and said rotation angle indicative signal.

20. The remote-controlling commander as set forth in claim 19, wherein said controller is also responsive to rotation of said dial in the presence of said command for performing forward and reverse playback selectively at a given speed according to rotation of said dial.

21. The remote-controlling commander as set forth in claim 19, wherein said dial and said ring are associated with a common rotary plate with which said first [, second] and second sensing means are associated for monitoring the direction, magnitude and speed of angular displacement thereof.

22. The remote-controlling commander as set forth in claim 21, wherein said dial is further associated with a click mechanism providing a detent action at every given angle of angular displacement, which given angle corresponds to one frame of a video signal.

* * * * *